US010943509B2

(12) United States Patent
Kirchhoff et al.

(10) Patent No.: US 10,943,509 B2
(45) Date of Patent: Mar. 9, 2021

(54) INTERACTIVE EDUCATION SYSTEM FOR TEACHING PATIENT CARE

(71) Applicant: GAUMARD SCIENTIFIC COMPANY, INC., Miami, FL (US)

(72) Inventors: Allan Richard Kirchhoff, Miami, FL (US); Roberto R. Robaina, Miami, FL (US)

(73) Assignee: Gaumard Scientific Company, Inc., Miami, FL (US)

( * ) Notice: Subject to any disclaimer, the term of this patent is extended or adjusted under 35 U.S.C. 154(b) by 467 days.

(21) Appl. No.: 15/223,795

(22) Filed: Jul. 29, 2016

(65) Prior Publication Data

US 2017/0039894 A1    Feb. 9, 2017

Related U.S. Application Data

(60) Provisional application No. 62/202,564, filed on Aug. 7, 2015.

(51) Int. Cl.
*G09B 23/32* (2006.01)
*G09B 23/30* (2006.01)

(52) U.S. Cl.
CPC ............. *G09B 23/32* (2013.01); *G09B 23/30* (2013.01)

(58) Field of Classification Search
CPC ..................................................... G09B 23/32
USPC ......................................................... 434/271
See application file for complete search history.

(56) References Cited

U.S. PATENT DOCUMENTS

| 2,817,845 | A | * | 12/1957 | Clarke | ................... | A61F 2/141 623/6.64 |
| 5,900,923 | A | * | 5/1999 | Prendergast | ........... | G09B 23/28 351/211 |
| 7,113,848 | B2 | | 9/2006 | Hanson | | |
| 7,575,330 | B2 | * | 8/2009 | Allen | ................... | H04N 9/3155 348/674 |
| 2008/0138778 | A1 | * | 6/2008 | Eggert | ................... | G09B 23/28 434/262 |
| 2012/0086018 | A1 | * | 4/2012 | Yao | ....................... | G01S 7/4813 257/82 |
| 2015/0286340 | A1 | * | 10/2015 | Send | ....................... | G01S 17/46 345/175 |

* cited by examiner

*Primary Examiner* — Kesha Frisby
(74) *Attorney, Agent, or Firm* — Haynes and Boone, LLP

(57) ABSTRACT

A patient simulator system includes a right eye assembly including a right eyelid and a right pupil, and a left eye assembly including a left eyelid and a left pupil, wherein the right pupil moves within an area of the right eye and the left pupil moves within an area of the left eye. In various embodiments, right/left optical sensors provide right/left electrical signals based on sensed light conditions associated with the right/left eyes, and a microprocessor changes a size of the right iris based on the right electrical signal, and changes a size of the left iris based on the left electrical signal. In various embodiments, the microprocessor electrically actuates at least one blink motor to rotate, wherein rotation of the at least one blink motor results in motion of the right eyelid and/or the left eyelid to simulate blinking.

48 Claims, 22 Drawing Sheets

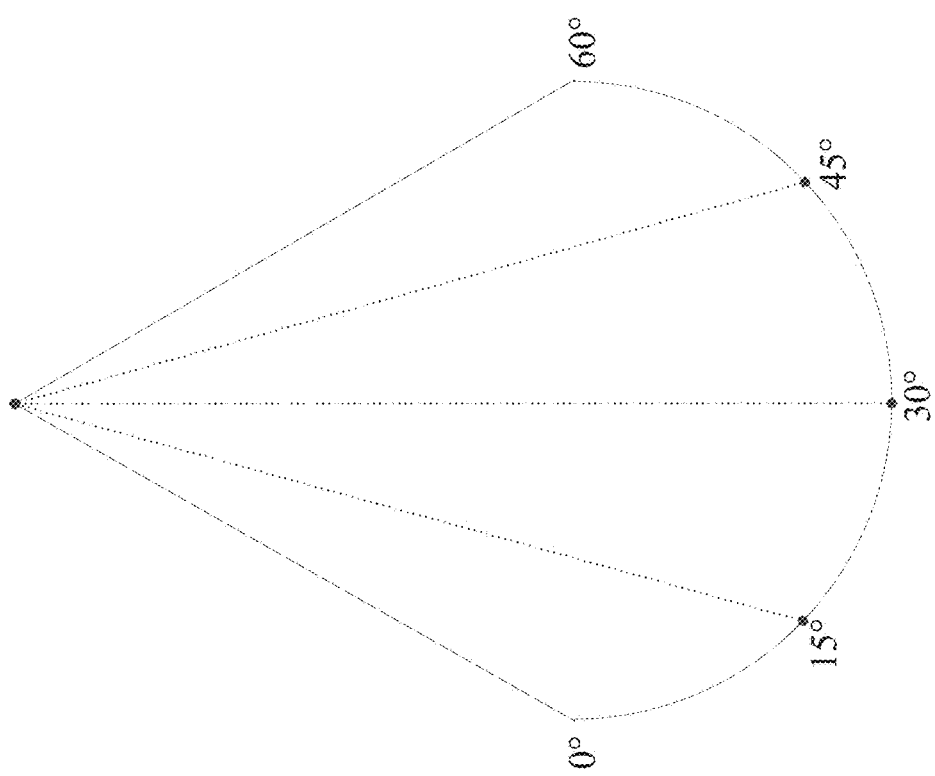

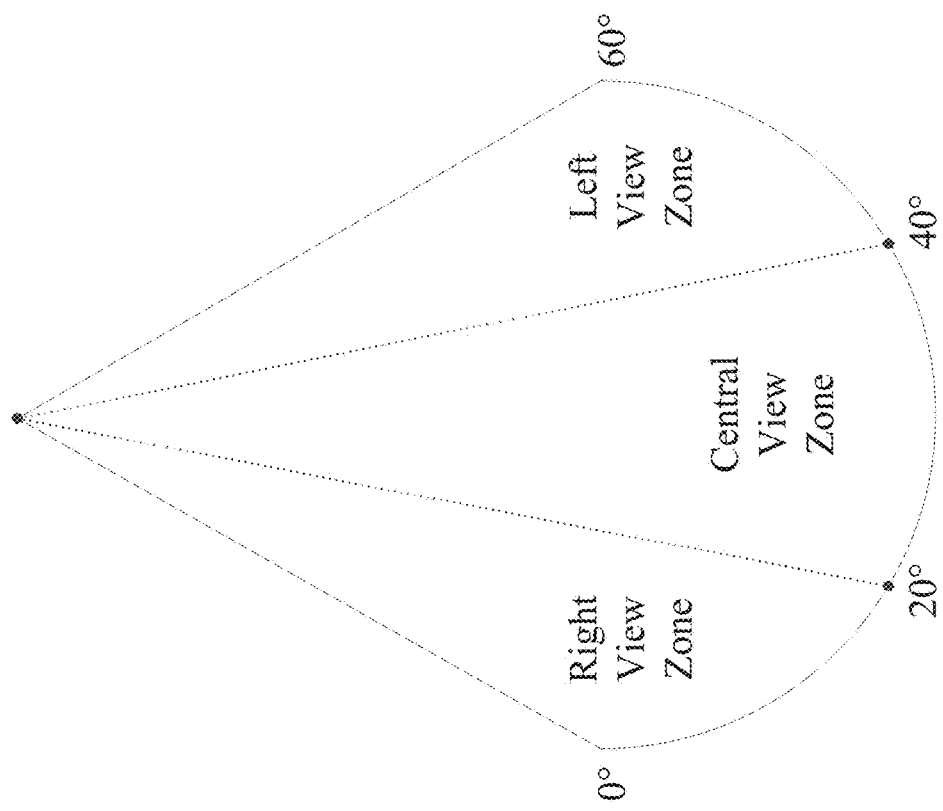

INTERACTIVE EDUCATION SYSTEM FOR TEACHING PATIENT CARE

CROSS-REFERENCE TO RELATED APPLICATIONS

The present application claims priority to and the benefit of U.S. Provisional Patent Application No. 62/202,564, filed Aug. 7, 2015, which is hereby incorporated by reference in its entirety.

TECHNICAL FIELD

The present disclosure relates generally to interactive education systems for teaching patient care. In particular, the present disclosure relates to an interactive educational eye assembly including a set of animatronic eyes that resemble real-life human eyes, both in appearance and dynamics, to allow execution of medical tests for educational and diagnostic purposes. The disclosed interactive educational eye assembly may be referred to as a simulator or a multipurpose eye motion trainer.

BACKGROUND

It is desirable to train medical personnel and students in patient care protocols before allowing physical contact with real patients. Such training may involve training material such as textbooks and flashcards. However, textbooks and flash cards lack failed to provide the important benefits of hands-on practice to the students. On the other hand, allowing inexperienced students to perform medical procedures on actual patients that would allow for the hands-on practice cannot be considered a viable alternative because of the inherent risk to the patient. Because of these factors, patient care education has often been taught using medical instruments to perform patient care activity on a simulator, such as a manikin. A manikin is, for example, a life-sized anatomical human model used for educational and instructional purposes.

Existing simulators fail to exhibit accurate symptoms and to respond appropriately to student stimuli, thereby failing to provide realistic medical training to the students. Existing simulators also fail to look and feel lifelike, which fails to improve the training process. As such, there is a need to provide a simulator that overcomes the above deficiencies of existing stimulators. To that end, the present disclosure discloses an interactive education system for use in conducting patient care training sessions that is realistic and/or includes additional simulated features.

SUMMARY

The present disclosure provides interactive education systems, apparatus, components, and methods for teaching patient care. In various embodiments, a patient simulator may include a right eye including a right eyelid and a right pupil, and a left eye including a left eyelid and a left pupil, wherein the right pupil is configured to move within an area of the right eye and the left pupil is configured to move within an area of the left eye. The right pupil and the left pupil may move in a horizontal direction or a vertical direction or a combination of the horizontal direction and the vertical direction. The patient simulator may include at least one infrared (IR) transmitter to transmit IR radiation towards an object placed in front of the eye assembly, at least one IR sensor to receive an IR response signal reflected off the object, and a microprocessor to determine a location of the object based on the sensing of the IR response signal by the at least one IR sensor, and to effect movement of the right pupil and/or the left pupil based on the determined location of the object. The IR transmitter may transmit the IR radiation in a burst of frequency modulated pulses In various embodiments, to effect movement of the right pupil and/or the left pupil, the microprocessor may compare a current position of the right pupil and/or the left pupil with the determined location of the object. The microprocessor may effect movement of the right pupil jointly with respect to the movement of the left pupil or may effect movement of the right pupil independently with respect to the movement of the left pupil. In various embodiments, the microprocessor may effect movement of the right pupil by a first displacement amount and to effect movement of the left pupil by a second displacement amount, the first displacement amount being different from the second displacement amount.

A method used in the patient simulator may include transmitting, via a first infrared (IR) transmitter, first IR radiation and transmitting, via a second infrared (IR) transmitter, second IR radiation towards an object placed in front of the simulator. The method may also include sensing, via a first IR sensor, a predetermined number of readings of first sensed data based on the first IR radiation being reflected off the object and sensing, via a second IR sensor, a predetermined number of readings of second sensed data based on the second IR radiation being reflected off the object. Further, the method may include averaging, via a microprocessor, the predetermined number of readings of the first sensed data to calculate average first sensed data and the predetermined number of readings of the second sensed data to calculate average second sensed data, and comparing the average first sensed data with the average second sensed data. Finally, the method may include determining a location of the object based on the comparing of the average first sensed data with the average second sensed data, and effecting movement of the right pupil and/or the left pupil based on a result of the comparing of the average first sensed data with the average second sensed data.

In various embodiments, the transmitting the first IR radiation and/or the transmitting the second IR radiation includes transmitting IR radiation in a burst of frequency modulated pulses. Also, the sensing may include recording a value corresponding to an intensity of the first and/or second IR radiation being reflected off the object. In various embodiments, the effecting movement of the right pupil and/or the left pupil includes effecting movement of the right and/or left pupil in a horizontal or a vertical direction, or a combination of horizontal and the vertical direction. The determining the location of the object may include determining that the location of the object is in front of the first IR sensor when the first average sensed data is greater than the second average sensed data, and the effecting movement of the right pupil and/or the left pupil may include orienting a position of the right pupil and/or the left pupil towards the determined location of the object in front of the first IR sensor. In various embodiments, the effecting movement of the right pupil and/or the left pupil may include effecting movement of the right pupil jointly or independently with respect to the movement of the left pupil.

A patient simulator may include a right eye assembly including a right pupil having a right iris and a left eye assembly including a left pupil having a left iris. A right optical sensor may sense a light condition associated with the right eye, and provide a right electrical signal based on the same, and a left optical sensor may sense a light condition associated with the left eye, and provide a left electrical signal based on the same. In various embodiments, a microprocessor may change a size of the right iris based on the right electrical signal, and change a size of the left iris based on the left electrical signal. The microprocessor may be electrically connected to the right optical sensor and to the left optical sensor, and may receive the right electrical signal and the left electrical signal. In various embodiments, the right optical sensor is placed within the right eye and the left optical sensor is placed within the left eye.

The microprocessor may change the size of the right iris by increasing or decreasing a circular size of the right iris, and may change the size of the left iris by increasing or decreasing a circular size of the left iris. In various embodiments, the microprocessor may increase or decrease the circular size of the right iris and/or the left iris within a diametric range of 1 mm to 8 mm. Also, the microprocessor may change the circular size of the right iris and/or the left iris to a default size, a totally constricted size, or a totally dilated size. The microprocessor may decrease the circular size of the right iris and/or the left iris to simulate constriction and may increase the circular size of the right iris and/or the left iris to simulate dilation. In various embodiments, the microprocessor may simulate constriction under bright light conditions and may simulate dilation under dark light conditions. The microprocessor may change a circular size of the right iris by electrically actuating a right size motor that is mechanically coupled to the right iris, and may change a circular size of the left iris by electrically actuating the left size motor that is mechanically coupled to the left iris. In various embodiments, a single motor may be used to implement the right size motor and the left size motor.

A method used in the patient simulator may include sensing, via a right optical sensor, a light condition associated with the right eye including a right pupil having a right iris, and sensing, via a left optical sensor, a light condition associated with the left eye including a left pupil having a left iris. The method may further include changing, via a microprocessor, a size of the right iris based on the right electrical signal and of the left iris based on the left electrical signal. The sensing the light condition associated with the right eye may include sensing the light condition associated with the right eye by the right optical sensor from within the right eye, and the sensing the light condition associated with the left eye may include sensing the light condition associated with the left eye by the left optical sensor from within the left eye.

The changing the size may include receiving, at the microprocessor, the right electrical signal from the right optical sensor and the left electrical signal from the left optical sensor. In various embodiments, the changing the size includes changing the size of the right iris by increasing or decreasing a circular size of the right iris, and changing the size of the left iris by increasing or decreasing a circular size of the left iris. The changing the size may further include increasing or decreasing the circular size of the right iris and/or the left iris within a diametric range of 1 mm to 8 mm. In various embodiments, the changing the size may include changing the circular size of the right iris and/or the left iris to a default size, a totally constricted size, or a totally dilated size. The changing the size includes simulating constriction under bright light conditions and to simulate dilation under dark light conditions. Further, the changing may include changing a circular size of the right iris by electrically actuating the right size motor that is mechanically coupled to the right iris, and changing a circular size of the left iris by electrically actuating the left size motor that is mechanically coupled to the left iris.

A patient simulator may include a right eye assembly including a right eyelid and a right pupil and a left eye assembly including a left eyelid and a left pupil. At least one blink motor may be coupled to the right eyelid and to the left eyelid, and a microprocessor may electrically actuate the at least one blink motor to rotate, wherein rotation of the at least one blink motor results in motion of the right eyelid and/or the left eyelid to simulate blinking. The patient simulator may further include a right eyelid position sensor that electrically reports a current position of the right eyelid, and a left eyelid position sensor that electrically reports a current position of the left eyelid.

The right eyelid and/or the left eyelid and may move between a closed position and an open position. The closed position maybe the default position. In various embodiments, the motion of the right eyelid is independent from the motion of the left eyelid. The microprocessor may continuously monitor positions of the right eyelid using the right eyelid position sensor and of the left eyelid using the left eyelid position sensor. In various embodiments, the microprocessor may actuate rotation of the at least one blink motor in a first direction to effect closing of the right eyelid and the left eyelid, and may actuate rotation of the at least one blink motor in a second direction to effect opening of the right eyelid and the left eyelid. The microprocessor may actuate rotation of the motor in the second direction when right eyelid or the left eyelid is in the closed position. The microprocessor may control a speed of motion of the right eyelid and/or the left eyelid, and may control a speed of rotation of the at least one blink motor to control a rate of blinking of the right eyelid and/or the left eyelid.

A method for using the patent simulator may include mechanically coupling at least one blink motor to a right eyelid of a right eye and to a left eyelid of the left eye, and electrically actuating, via a microprocessor, the at least one blink motor to rotate, wherein rotation of the at least one blink motor results in motion of the right eyelid and/or the left eyelid to simulate blinking. The electrically actuating may include receiving electrical signals associated with a current position of the right eyelid from a right eyelid position sensor, and receiving electrical signals associated with a current position of the left eyelid from a left eyelid position sensor. The motion of the right eyelid and/or the left eyelid may include motion between a closed position and an open position. The electrically actuating may also include continuously monitoring positions of the right eyelid using the right eyelid position sensor and of the left eyelid using the left eyelid position sensor.

In various embodiments, the electrically actuating may include actuating rotation of the at least one blink motor in a first direction to effect closing of the right eyelid and the left eyelid, and actuating rotation of the at least one blink motor in a second direction to effect opening of the right eyelid and the left eyelid. The electrically actuating may include actuating rotation of the motor in the second direction when the right eyelid or the left eyelid is in the closed position. Finally, the electrically actuating may include controlling a speed of rotation of the at least one blink motor to control a speed of motion of the right eyelid and/or the left eyelid, and controlling a speed of rotation of the at least one blink motor to control a rate of blinking of the right eyelid and/or the left eyelid.

BRIEF DESCRIPTION OF THE DRAWINGS

Other features and advantages of the present disclosure will become apparent in the following detailed description of illustrative embodiments with reference to the accompanying of drawings, of which:

FIG. 3A illustrates a plan view of an exemplary range of horizontal movement for the right and left pupils according to various embodiments of the present disclosure.

FIG. 3B illustrates a plan view of another exemplary range of horizontal movement for the right and left pupils according to various embodiments of the present disclosure.

DETAILED DESCRIPTION

Figure 1:
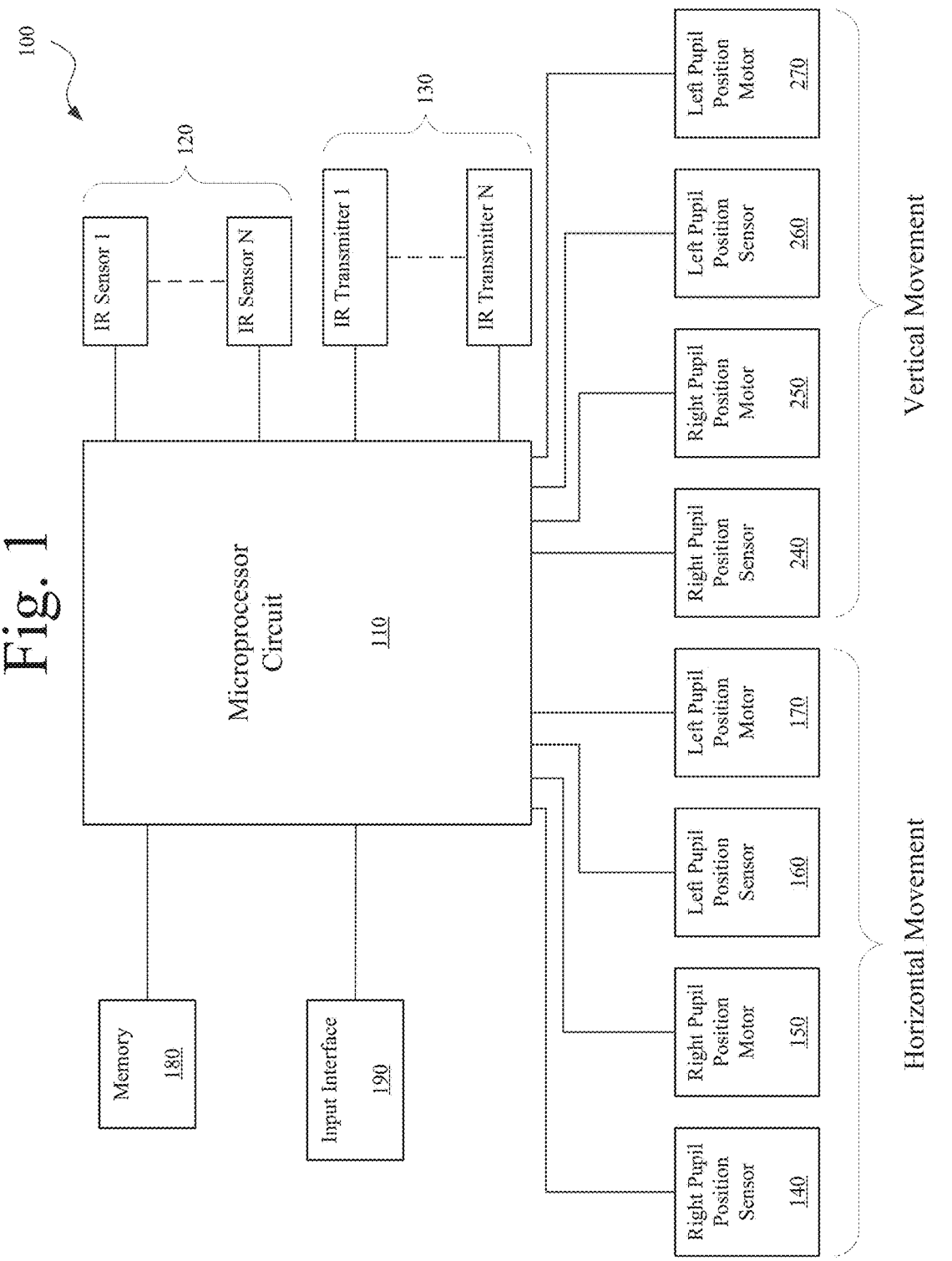
FIG. 1 illustrates an exemplary schematic block diagram 100 of the simulator according to various embodiments of the present disclosure.

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications in the described devices, instruments, methods, and any further application of the principles of the disclosure as described herein are contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure.

As discussed above, the present disclosure discloses an interactive educational system for use in conducting patient care training sessions that is realistic and/or includes additional simulated features. In various embodiments, the presently disclosed simulator or multipurpose eye motion trainer realistically replicates the motion of a human eye in response to user stimuli in a way that is useful for medical educational and diagnostic purposes. The multipurpose eye motion trainer includes novel eye movement and eye tracking features. These features are critical because eye movement conveys important health information regarding the patient. For example, impaired eye movement may indicate that the patient has suffered from or is at risk of suffering from a stroke and/or brain/muscle damage.

In various embodiments, the presently disclosed simulator or multipurpose eye motion trainer may replicate performance of an "accommodation test," which is used to examine any impairment in the eyes of a patient. During the "accommodation test," a doctor instructs the patient to view an object, and to track horizontal and vertical movements of the object with the patient's eyes (without moving their head). If the patient is unable to follow the object with both eyes, such that, for example, one eye lags behind another during the tracking, then this impaired eye movement indicates that the patient has a motor impairment with respect to the eyes, which often results due to having suffered a stroke and/or brain damage. In this way, the presently disclosed multipurpose eye motion trainer serves as an educational and diagnostic simulator by simulating eye movement and eye tracking. However, existing simulators do not include the novel eye movement or eye tracking features. As such, the existing simulators fail to provide realistic educational or diagnostic training to the students.

Simulation of Movement: FIG. 1 illustrates an exemplary schematic block diagram 100 of the simulator according to various embodiments of the present disclosure. The simulator (see FIG. 2) may be a manikin in the form of a human face, and may include an eye assembly. The eye assembly may include a right eye assembly 101 of the simulator, a left eye assembly 105 of the simulator, and associated circuitry to control functions to be performed by the right and left eyes 101, 105. The right eye assembly 101 may include a right pupil 102 and a right eyelid 103. The left eye assembly 105 may include a left pupil 106 and a left eyelid 107. The simulator may include a microcontroller 110, one or more IR sensors 120, one or more IR transmitters 130, an electronic memory 180, and an input/output interface 190. As discussed in further detail below, for simulating horizontal movement, the simulator may include a right pupil position sensor 140, a right pupil motor 150, a left pupil position sensor 160, a left pupil motor 170. Similarly, for simulating vertical movement, the simulator may include a right pupil position sensor 240, a right pupil motor 250, a left pupil position sensor 260, a left pupil motor 270. The separate right and left motors 150, 170 allow independent control of horizontal movement of the right and left pupils 102, 106, respectively. Similarly, the separate right and left motors 250, 270 allow independent control of vertical movement of the right and left pupils 102, 106, respectively. The independent control of the pupils is relevant because it allows medical tests to be performed individually on each eye. The right and left pupil position sensors 140, 160, 240, 260 may be rotary position sensors that sense rotational positions of the right and left pupils 102, 106 respectively.

The microcontroller 110 may include an integrated circuit (e.g., ASIC) and may be programmed with appropriate software to allow the simulated eye tracking and eye movements of the right and left pupils 102, 106. The input/output interface 190 may include peripheral input devices like a keyboard, mouse and joystick, and output devices such as a display, speakers, and a printer. The microcontroller 110 may exchange information with connected components (internal and external) by using a Universal Serial Bus (USB), a one-wire RS-232 communication interface, or a I2C communication interface.

The microcontroller 110 may be electrically connected to the one or more IR transmitters 130, and controls operations of the one or more IR transmitters 130. For example, the microcontroller 110 controls radiation of the IR radiation from each of the IR transmitters 130. Also, the microcontroller 110 is electrically connected to the one or more IR sensors 120, and controls operation of the one or more IR sensors 120. For example, the microcontroller 110 controls sensing of reflected IR response signals by the one or more IR sensors 120. That is, to simulate eye tracking and eye movement, the microcontroller 110 instructs at least one IR transmitter 130 to transmit IR radiation and instructs at least one IR sensor 120 to sense IR response signals reflected off the object. The microcontroller 110 may store the sensed IR response signals by the at least one IR sensor 120 in the electronic memory 180. Based on the IR response of the sensed IR response signals, the microcontroller 110 decodes the presence and location of the object. In various embodiments, the sensing of the IR response signals may include sensing an intensity of the reflected IR response signals, and recording a (digital) value corresponding to the sensed intensity of the IR response signals. The microcontroller 110 may compare the recorded values, and may determine that the object is placed closest to the sensor that records the greatest value. That is, the microcontroller 110 may determine that the object is placed closest to the sensor that senses IR response signals having the highest intensity. When two IR sensors measure substantially equal IR responses, the microcontroller 110 may determine that the object is placed in between the two IR sensors. For example, the microcontroller 110 may calculate a difference between two different values recorded by two different IR sensors, and may determine that the object is placed between the two different IR sensors when the calculated difference is less than a predetermined threshold value. In various embodiments, the IR response may have to be equal to or greater than a predetermined threshold IR response value for the at least one IR sensor to sense the IR response signal.

Once the microcontroller 110 has decoded the location of the object with respect to the known locations of the IR sensors 120, the microcontroller 110 may instruct the right pupil position sensor 140 to report a current position of a right pupil 102 within the right eye 101. Similarly, the microcontroller 110 may instruct the left pupil position sensor 160 to report a current position of the left pupil 106 within the left eye 105. The microcontroller 110 may then independently compare the current positions of the right and left pupils 102, 106 with respect to the decoded location of the object, and determine whether the current positions of the right and left pupils 102, 106 correspond to the decoded location of the object. For example, to determine whether the current positions of the right and left pupils 102, 106 correspond to the decoded location of the object, the microcontroller 110 may determine whether the current positions of the right and left pupils 102, 106 are oriented towards the decoded location of the object.

The microcontroller 110 may determine to effect no change in the current positions of the right and left pupils 102, 106 when it is determined that the current positions of both the right and left pupils 102, 106 correspond to the decoded location of the object. However, the microcontroller 110 may instruct the right pupil motor 150 to change the current position of the right pupil 102 when it is determined that the current position of the right pupil 102 does not correspond to the decoded location of the object. For example, the microcontroller 110 may instruct the right pupil motor 150 to position the right pupil 102 such that the right pupil 102 is oriented (i.e., looking) towards the decoded location of the object. Similarly, the microcontroller 110 may instruct the left pupil motor 170 to change the current position of the left pupil 106 when it is determined that the current position of the left pupil 106 does not correspond to the decoded location of the object. For example, the microcontroller 110 may instruct the left pupil motor 170 to position the left pupil 106 such that the left pupil 106 is oriented (i.e., looking) towards the decoded location of the object.

In various embodiments, the microcontroller 110 may change the positions of the right and left pupils 102, 106 in the horizontal direction, the vertical direction, and in a combination of horizontal and vertical directions. The ability of the simulator to effect changes in the positions of the right and left pupils 102, 106 in all of the above directions allows the simulator to realistically simulate various medical tests performed by doctors on human eyes. Further, the microcontroller 110 may change the current position of the right pupil 102 independently from the current position of the left pupil 106. Further, the microcontroller 110 may change the current position of the right pupil 102 by an amount of displacement that is lower than, equal to, or greater than a displacement of the left pupil 106, and vice versa.

Horizontal Movement: Simulation of horizontal movement of the right and left pupils 102, 106 in accordance with placement and movement of an object (e.g., pencil, finger, etc.) will now be described. Simulating horizontal movement includes placing the object at an eye-level in front of the simulator and moving the object in a horizontal plane that is parallel to the horizontal plane that includes the left and right eyes 101, 105. The right and left eyes 101, 105 are sized, shaped, and colored to simulate natural human eyes. The simulator senses the presence and the movement of the object using the three IR sensors 120, 121, 122 and the four IR transmitters 130, 131, 132, 133, and allows for corresponding horizontal movements of the right and left pupils 102, 106. In various embodiments, the horizontal movement of the right and left pupils 102, 106 may be controlled such that the right and left pupils 102, 106 move together. Alternatively, in various embodiments, the horizontal movement of the right pupil 102 is controlled independently from the horizontal movement of the left pupil 106. Further, the amount of horizontal displacement of the right pupil 102 may be same or different with respect to the amount of horizontal displacement of the left pupil 106.

Figure 2:
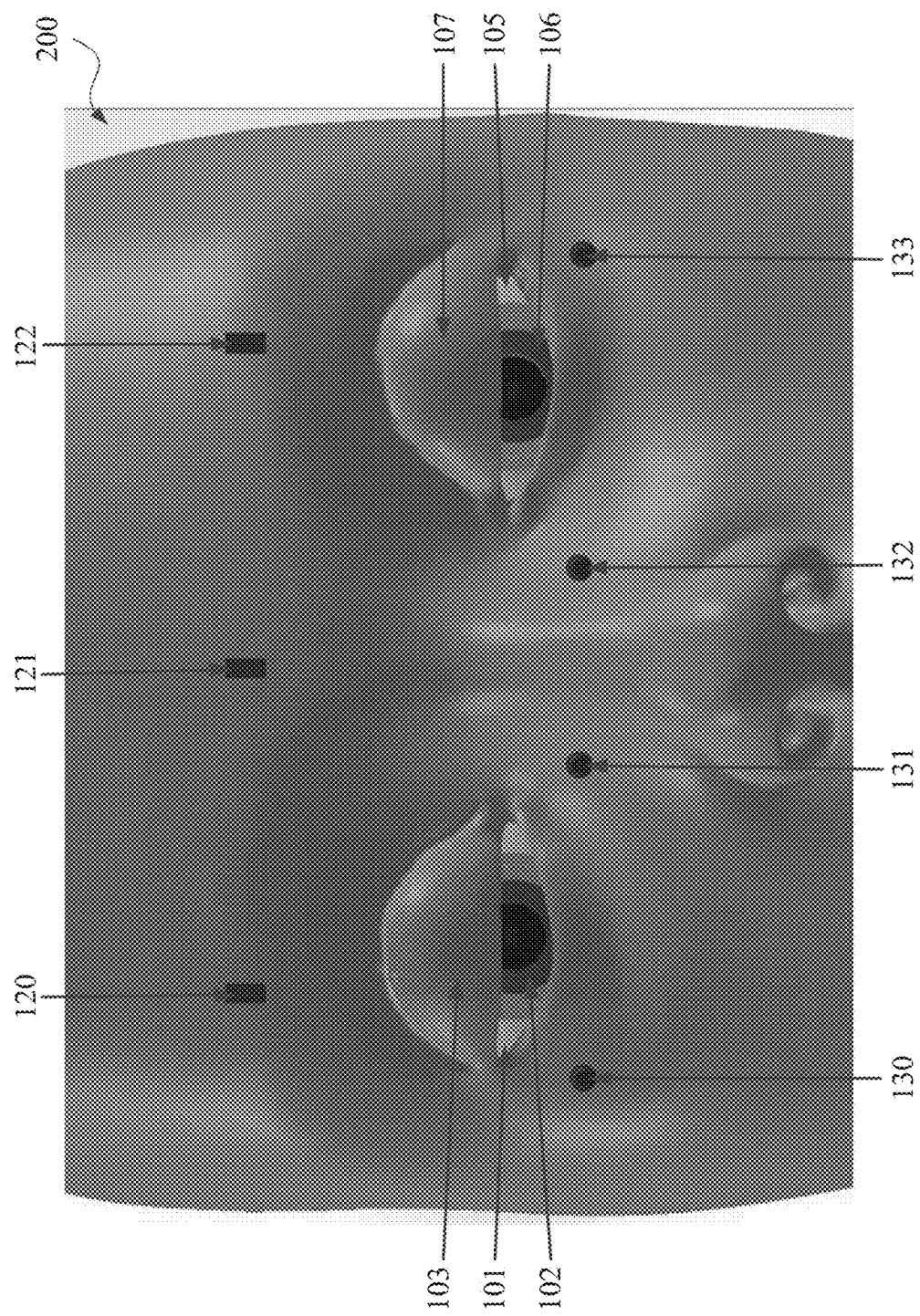
FIG. 2 illustrates a simulator 200 including the exemplary multipurpose eye motion trainer according to various embodiments of the present disclosure.

FIG. 2 illustrates a simulator 200 including the exemplary multipurpose eye motion trainer according to various embodiments of the present disclosure. The simulator 200 may be a manikin in the form of a human face, and may include an eye assembly. The eye assembly may include the above discussed right and left eyes 101, 105, and associated circuitry to control functions to be performed by the right and left pupils 102, 106. The right eye 101 may include a right eyelid 103, and the left eye 105 may include a left eyelid 107. The associated circuitry for simulation of horizontal movement may include three infrared (IR) sensors 120, 121, 122 and four infrared (IR) transmitters 130, 131, 132, 133 that are electrically controlled by the microcontroller 110. The IR sensors and the IR transmitters may be placed under silicone skin (with special openings) of the simulator 200. This allows the simulator 200 to appear more lifelike.

In various embodiments, the IR sensors 120, 121, 122 may be placed in a forehead section of the simulator 200 in close proximity to the eyes 101, 105. For example, as shown in FIG. 2, the IR sensors 120, 121, 122 may be placed in a horizontal plane above the horizontal plane that includes the right and left eyes 101, 105. However, in various embodiments, the IR sensors 120, 121, 122 may be placed in different horizontal planes as long as they allow the functions to be performed by the eye assembly discussed in the present disclosure. Also, the IR transmitters 130, 131, 132, 133 may be placed in a horizontal plane in close proximity to the right and left eyes 101, 105. For example, as shown in FIG. 2, the IR transmitters 130, 131, 132, 133 may be placed in a horizontal plane near the horizontal plane that includes the right and left eyes 101, 105. However, in various embodiments, the IR transmitters 130, 131, 132, 133 may be placed in different horizontal planes as long as they allow the functions to be performed by the eye assembly discussed in the present disclosure. In various embodiments, the eye movement and/or eye tracking is simulated using the IR sensors 120, 121, 122 and the IR transmitters 130, 131, 132, 133.

One or more of the three IR sensors 120, 121, 122 may be coupled to sensing IR response signals originating from one or more of the four IR transmitters 130, 131, 132, 133 to form respective sensor-transmitter pairs. For example, in the present embodiment for horizontal movement, the IR sensor 120 may be configured to sense IR response signals resulting from IR transmissions from the IR transmitter 130, the IR sensor 121 may be configured to sense IR response signals resulting from IR transmission from two IR transmitters 131, 132, and the IR sensor 122 may be configured to sense IR response signals resulting from IR transmissions from the IR transmitter 132. In various embodiments, the two IR transmitters 131, 132 may be connected in series and may operate together such that the two IR transmitters 131, 132 are turned on and off at the same time. An IR sensor may be coupled to an IR transmitter by tuning the sensing frequency of the IR sensor to the transmitting modulated frequency of the IR transmitter and/or by positioning the IR sensor in close proximity to the IR transmitter. The tuning of the sensing frequency to the transmitting modulated frequency results in the IR sensor being isolated from environmental conditions so as to allow accurate sensing of the IR response signal.

FIG. 3A illustrates a plan view of an exemplary range of horizontal movement for the right and left pupils 102, 106 according to various embodiments of the present disclosure.

The right and the left pupils 102, 106 may be identical, but maybe controlled independently from each other with respect to movement (e.g., horizontal, vertical, etc.). The exemplary range of horizontal motion may be 60° with the center being at 30°, as shown FIG. 3A. That is, each pupil 102, 106 may be centered at the default position of 30°, and may be rotated to the left of the default position by 30° (to the 60° position) and to the right of the default position by 30° (to the 0° position). FIG. 3A shows the 30° position as the default position of the right and left pupils 102, 106. In the default position, the right and left pupils 102, 106 may be placed in the center of the right and left eyes 101, 105, respectively, to simulate a person looking substantially straight ahead. FIG. 3A also shows a position of the right and left pupils 102, 106 rotated to the right of the default position by 15° (the 15° position). This position simulates a person slightly looking to the right. Further, FIG. 3A shows a position of the right and left pupils 102, 106 rotated to the right of the default position by 30° (the 0° position). This position simulates a person looking further to the right. FIG. 3A shows a position of the right and left pupils 102, 106 rotated to the left of the default position by 15° (the 45° position). This position simulates a person slightly looking to the left. Finally, FIG. 3A shows a position of the right and left pupils 102, 106 rotated to the left of the default position by 30° (the 60° position). This position simulates a person looking further to the left.

FIG. 3B illustrates a plan view of another exemplary range of horizontal movement for the right and left pupils 102, 106 according to various embodiments of the present disclosure. In various embodiments, the total range of horizontal movement may be divided into zones. For example, as shown in FIG. 3B, the range of horizontal movement may be divided into three equal zones. The three equal zones may be, for example, a right view zone, a central view zone, and a left view zone. In the default position, the right and left pupils 102, 106 may be placed in the central view zone of the right and left eyes 101, 105, respectively, to simulate a person looking substantially straight ahead. The right and left pupils 102, 106 may be placed in the right view zone of the right and left eyes 101, 105, respectively, to simulate a person looking substantially to the right. Finally, the right and left pupils 102, 106 may be placed in the left view zone of the right and left eyes 101, 105, respectively, to simulate a person looking substantially to the left.

The simulation of horizontal movement of the right and left pupils 102, 106 may be conducted in two modes—the joint tracking mode or the independent tracking mode. In the joint tracking mode, both the right and the left pupils 102, 106 may be controlled together such that the right and left pupils 102, 106 are displaced jointly in the same direction. Alternatively, in the independent tracking mode, the right pupil 102 may be controlled independently with respect to the left pupil 106 such that the right pupil 102 may move with a different amount of displacement with respect to the left pupil 106. For example, when an object is placed to the left of the simulator 200, the left pupil 106 may be rotated to the left of its default position by 15° (to the 45° position) and the right pupil 102 may be rotated to the left of its default position by 30° (to the 60° position). In addition, in the independent tracking mode, the right pupil 102 may move in a different direction with respect to the left pupil 106. For example, two objects may be placed in front of the simulator 200, such that a first object is in front of the IR sensor 120 and a second object is in front of the IR sensor 122. In this case, the right pupil 102 may be rotated to the right of its default position by 15° (to the 15° position) or by 30° (to the 0° position) to be oriented (i.e., looking) towards the object in front of the IR sensor 120, and the left pupil 106 may be rotated to the left of its default position by 15 (to the 45° position) or 30° (to the 60° position) to be oriented (i.e., looking) towards the object in front of the IR sensor 122.

Figure 4:
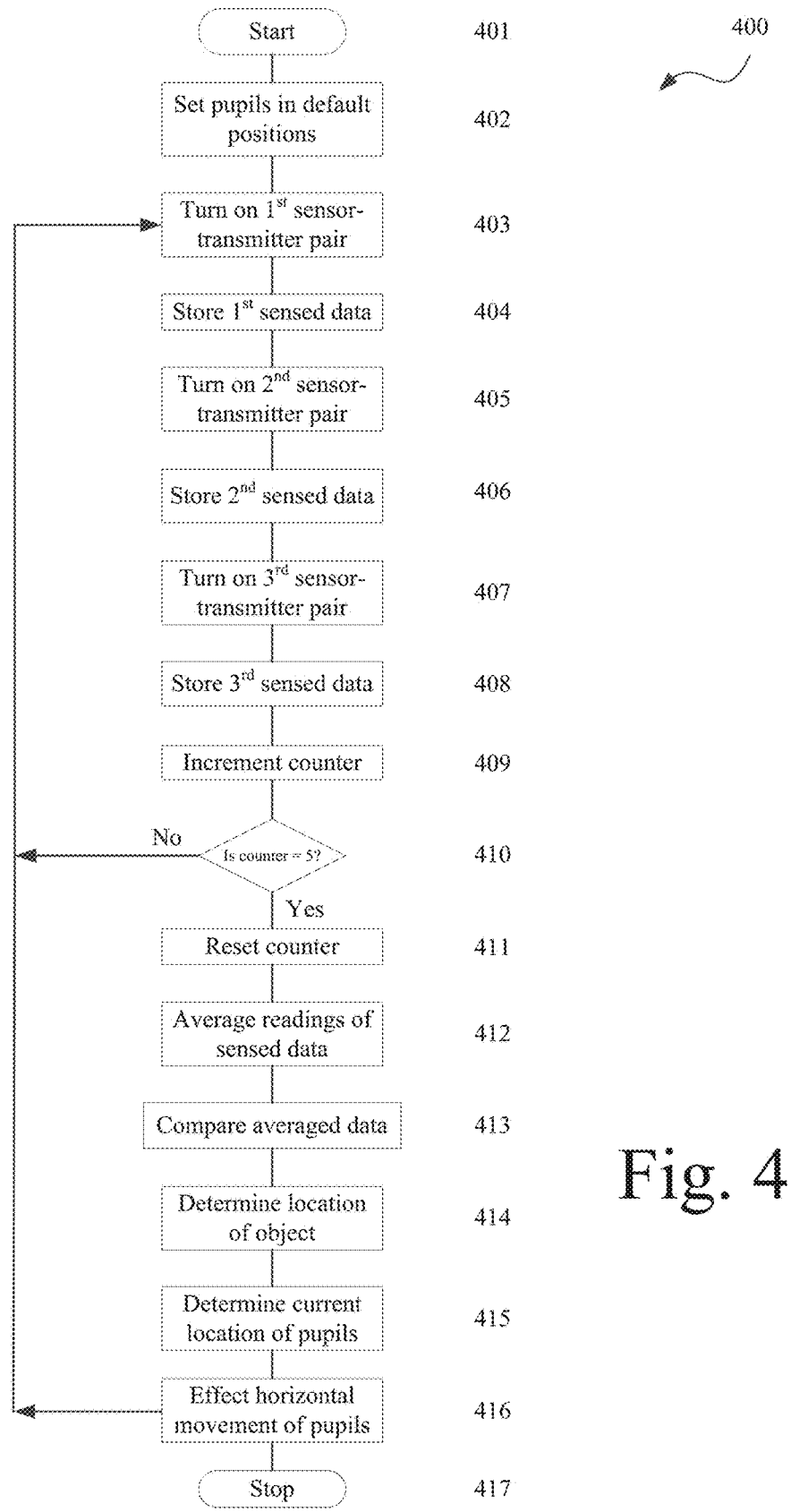
FIG. 4 illustrates an exemplary method 400 for performing simulation of horizontal movements in the joint tracking mode according to various embodiments of the present disclosure.

FIG. 4 illustrates an exemplary method 400 for performing simulation of horizontal movements in the joint tracking mode according to various embodiments of the present disclosure. The method starts at step 401. At step 402, the microcontroller 110 places both the right and left pupils 102, 106 in the default positions such that both eyes appear to be looking substantially straight ahead. For example, the microcontroller 110 may instruct the right pupil motor 150 to place the right pupil 102 in its default position at 30° and may instruct the left pupil motor 170 to place the left pupil 106 in its default position at 30°. At this time, an object (e.g., finger, pencil, etc.) may be placed at eye-level in front of the simulator.

At step 403, the microcontroller 110 turns on the first coupled sensor-transmitter pair of the IR sensor 120 and the IR transmitter 130. In various embodiments, when the first coupled sensor-transmitter pair is turned on, the IR transmitter 130 may transmit a burst of frequency modulated IR radiations. The burst may include 100 pulses, each pulse having a period of about 2 µs and a duty cycle of 50%. The transmitted pulses of IR radiations may reflect off the surface of the object in front of the simulator and the resulting IR response signals are sensed by the IR sensor 120. As previously discussed, the IR sensor 120 may sense the IR response signals and record a value corresponding to the sensed intensity of the reflected IR response signals. At this time, the first coupled sensor-transmitter pair of the IR sensor 120 and the IR transmitter 130 may be turned off.

At step 404, the microprocessor 110 stores the IR response data sensed by the IR sensor 120 in the electronic memory 180 as a reading of first sensed data.

At step 405, the microcontroller 110 turns on the second coupled sensor-transmitter pair of the IR sensor 121 and IR transmitters 131, 132 connected in series. In various embodiments, when the second coupled sensor-transmitter pair is turned on, the IR transmitters 131, 132 may transmit bursts of frequency modulated IR radiations. The burst may include 100 pulses, each pulse having a period of about 2 µs and a duty cycle of 50%. The transmitted pulses of IR radiations may reflect off the surface of the object in front of the simulator and the resulting IR response signals are sensed by the IR sensor 121. As previously discussed, the IR sensor 121 may sense the IR response signals and record a value corresponding to the sensed intensity of the reflected IR response signals. At this time, the second coupled sensor-transmitter pair of the IR sensor 121 and the IR transmitters 131, 132 may be turned off.

At step 406, the microprocessor 110 stores the IR response data sensed by the IR sensor 121 in the electronic memory 180 as a reading of second sensed data.

At step 407, the microcontroller 110 turns on the third coupled sensor-transmitter pair of the IR sensor 122 and the IR transmitter 133. In various embodiments, when the third coupled sensor-transmitter pair is turned on, the IR transmitter 133 may transmit a burst of frequency modulated IR radiations. The burst may include 100 pulses, each pulse having a period of about 2 µs and a duty cycle of 50%. The transmitted pulses of IR radiations may reflect off the surface of the object in front of the simulator and the resulting IR response signals are sensed by the IR sensor 122. As previously discussed, the IR sensor 122 may sense the IR response signals and record a value corresponding to the sensed intensity of the reflected IR response signals. At this time, the third coupled sensor-transmitter pair of the IR sensor 122 and the IR transmitter 133 may be turned off.

At step 408, the microprocessor 110 stores the IR response data sensed by the IR sensor 122 in the electronic memory 180 as a reading of third sensed data.

At step 409, once all the sensor-transmitter pairs have been cycled through and sensed data from all the IR sensors has been recorded, the microprocessor 110 increments a counter having an initial value of zero. That is, at step 409, the microprocessor 110 increments the counter to have a value of 1. This signifies that one cycle of collecting and recording data from all the IR sensors has been completed.

At step 410, the microprocessor 110 determines whether the counter value is equal to a predetermined value. This predetermined value may be a predetermined number of cycles for collecting and recording data from all the IR sensors after which the microprocessor 110 processes the recorded data to determine the location of the object and to effect movement of the right and left pupils 102, 106 to correspond to the determine location of the object. In the present embodiment, the predetermined value is set to 5. That is, the data is collected and recorded from all the IR sensors for five cycles after which the microprocessor 110 processes the recorded data to determine the location of the object and to effect corresponding movement of the right and left pupils 102, 106. However, any integer value greater than zero may be used as the predetermined value.

If the microprocessor 110 determines that the counter value is not equal to the predetermined value, then the method moves to step 403. Alternatively, if the microprocessor 110 determines that the counter value is equal to the predetermined value, the method moves to step 411. At this point, the microprocessor 110 has determined that five cycles of collecting and recording data from all the IR sensors has been completed.

At step 411, the microprocessor 110 resets the counter such that the counter value is equal to zero.

At step 412, the microprocessor 110 averages the five readings of the first sensed data and records the results as average first sensed data, averages the three readings of the second sensed data and records the result as average second sensed data, and averages the three readings of the third sensed data and records the result as average third sense data.

At step 413, the microprocessor 110 compares the values of the average first sensed data, the average second sensed data, and the average third sensed data. Based on the comparison, the microprocessor 110 determines which average sensed data has the highest value.

At step 414, the microprocessor 110 determines the location of the object to be in front of the IR sensor associated with the average sensed data having the highest value. For example, if at step 413, the microprocessor 110 determines that the first average sensed data has the highest value, then the microprocessor 110 determines that the location of the object is in front of the IR sensor 120. Similarly, if at step 413, the microprocessor 110 determines that the second average sensed data has the highest value, then the microprocessor 110 determines that the location of the object is in front of the IR sensor 121. Finally, if at step 413, the microprocessor 110 determines that the third average sensed data has the highest value, then the microprocessor 110 determines that the location of the object is in front of the IR sensor 122. Also, as discussed previously, the microcontroller 110 may calculate a difference between two different values recorded by two different IR sensors, and may determine that the object is placed between the two different IR sensors when the calculated difference is less than a predetermined threshold value.

Once the microprocessor 110 has determined the location of the object, at step 415, the microprocessor 110 may determine the current positions of the right and left pupils 102, 106. In various embodiments, the microprocessor 110 may instruct the right and left pupil sensors 140, 160 to respectively report the current positions of the right and left pupils 102, 106.

At step 416, the microprocessor 110 may effect horizontal movement of the right and left pupils 102, 106. In order to do so, the microprocessor 110 may first compare the reported current positions of the right and left pupils 102, 106 with the location of the object, as determined in step 414. If, based on the comparison of the reported current positions and the determined location of the object, the microprocessor 110 determines that the reported current positions of the right and left pupils 102, 106 correspond to the determined location of the object, then the microprocessor 110 may determine that no change to the reported current positions of the right and the left pupils 102, 106 is necessary, and may allow the right and left pupils 102, 106 to remain in their reported current positions.

However, if based on the comparison of the reported current positions and the determined location of the object, the microprocessor 110 determines that the reported current positions of the right and left pupils 102, 106 do not correspond to the determined the location of the object, then the microprocessor determines that the positions of the right and left pupils 102, 106 should be changed to correspond to the determined location of the object. At this time, the microprocessor 110 may instruct the right pupil motor 150 to position the right pupil 102 such that the right pupil 102 is oriented (i.e., looking) towards the determined location of the object. Similarly, the microprocessor 110 may instruct the left pupil motor 170 to position the left pupil 106 such that the left pupil 106 is oriented (i.e., looking) towards the determined the location of the object.

The method then proceeds to step 403, and steps 403-416 are repeated. The method stops at 417. In this way, the location of the object is determined and the horizontal movement of the pupils 102, 106 is effected after every occurrence of a predetermined number of cycles, the predetermined number being equal to the predetermined value of the counter (e.g., five cycles). That is, the simulator allows for determination of the location of the object and for tracking of the object by the right and left pupils 102, 106 after every occurrence of a predetermined number of cycles. The method 400 stops when the tracking functionality is stopped. At this time, the microcontroller 110 places both the right and left pupils 102, 106 in their default positions.

Figure 5:
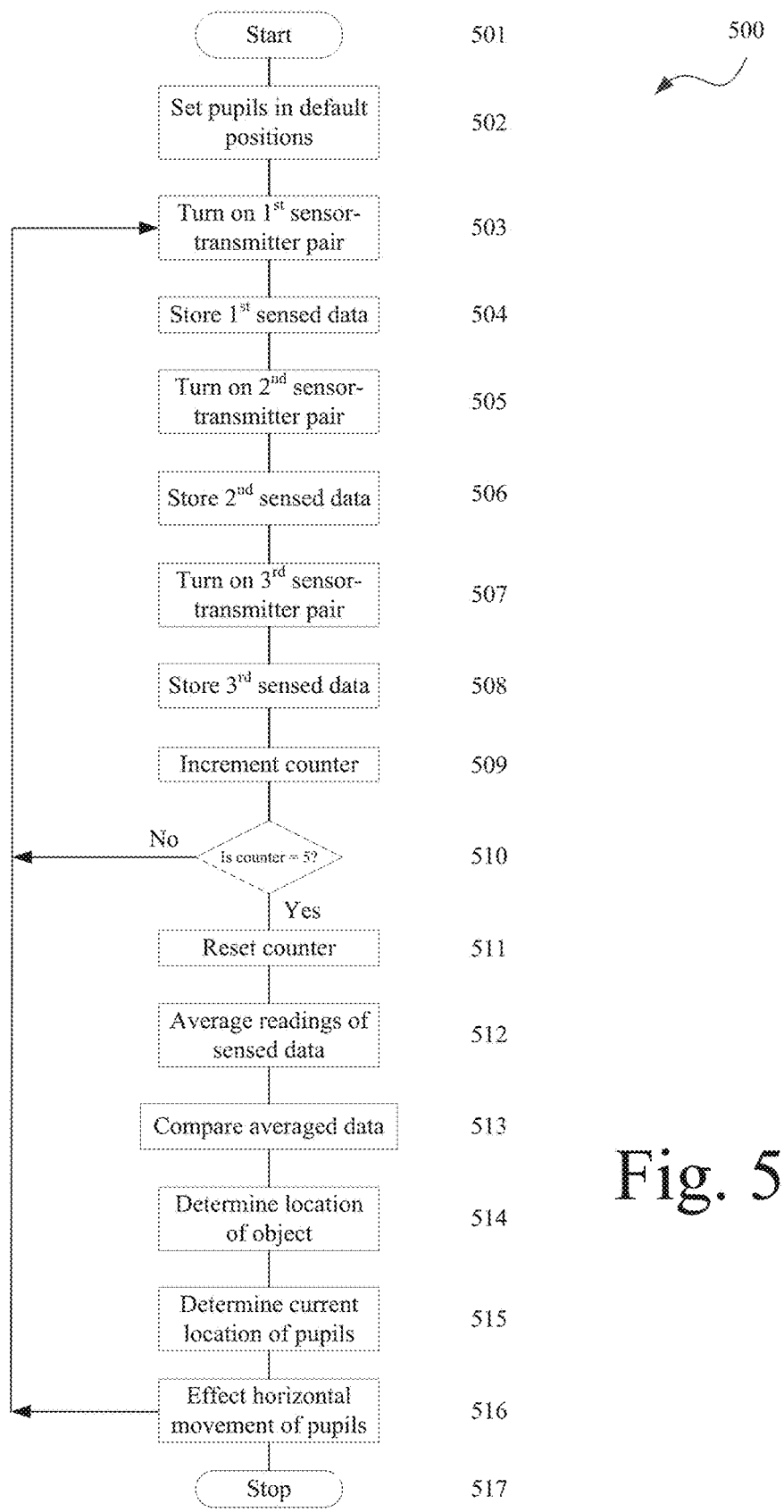
FIG. 5 illustrates an exemplary method 500 for performing simulation of horizontal movements in the independent tracking mode according to various embodiments of the present disclosure.

FIG. 5 illustrates an exemplary method 500 for performing simulation of horizontal movements in the independent tracking mode according to various embodiments of the present disclosure. In the independent tracking mode, the microprocessor 110 determines and effects the position of the right pupil 102 independently from the position of the left pupil 106. In various embodiments, the microprocessor 110 effects the position of the right pupil 102 based on the readings from the first and second sensor-transmitter pairs. That is, the microprocessor 110 determines the position of the right pupil 102 based on the readings from the sensor-transmitter pair including IR sensor 120 and IR transmitter 130 and the readings from the sensor-transmitter pair including IR sensor 121 and IR transmitters 131-132. Similarly, the microprocessor 110 effects the position of the left pupil 106 based on the readings from the second and third sensor-transmitter pairs. That is, the microprocessor 110 determines the position of the left pupil 106 based on the readings from the sensor-transmitter pair including IR sensor 121 and IR transmitters 131-132 and the readings from the sensor-transmitter pair including IR sensor 122 and IR transmitter 133.

Steps 501-512 of method 500 are identical to the steps 401-412 of method 400 discussed above with respect to FIG. 4. As such, description of the steps will be omitted in the description of the method 500.

At step 513, the microprocessor 110 first compares the values of the average first sensed data with the average second sensed data to determine which average sensed data has the highest value. As discussed below, the microprocessor 110 effects the position of the right pupil 102 based on the determined highest value from the first comparison. Second, the microprocessor 110 compares the values of the average second sensed data with the average third sensed data to determine which average sensed data has the highest value. As discussed below, the microprocessor 110 effects the position of the left pupil 106 based on the determined highest value from the second comparison.

For positioning the right pupil 102, at step 514, the microprocessor 110 determines the location of the object to be in front of the IR sensor associated with the average sensed data having the highest value. For example, if at step 513, the microprocessor 110 determines that the first average sensed data has the highest value, then the microprocessor 110 determines that the location of the object is in front of the IR sensor 120. Similarly, if at step 513, the microprocessor 110 determines that the second average sensed data has the highest value, then the microprocessor 110 determines that the location of the object is in front of the IR sensor 121. Also, as discussed previously, the microcontroller 110 may calculate a difference between two different values recorded by different IR sensors 120, 121, and may determine that the object is placed between the two different IR sensors 120, 121 when the calculated difference is less than a predetermined threshold value. Similarly, for positioning the left pupil 106, at step 514, the microprocessor 110 determines the location of the object to be in front of the IR sensor associated with the average sensed data having the highest value. For example, if at step 513, the microprocessor 110 determines that the second average sensed data has the highest value, then the microprocessor 110 determines that the location of the object is in front of the IR sensor 121. Similarly, if at step 513, the microprocessor 110 determines that the third average sensed data has the highest value, then the microprocessor 110 determines that the location of the object is in front of the IR sensor 122. Also, as discussed previously, the microcontroller 110 may calculate a difference between two different values recorded by different IR sensors 121, 122, and may determine that the object is placed between the two different IR sensors 121, 122 when the calculated difference is less than a predetermined threshold value.

Once the microprocessor 110 has determined the location of the object, at step 515, the microprocessor 110 may determine the current positions of the right and left pupils 102, 106. In various embodiments, the microprocessor 110 may instruct the right and left pupil sensors 140, 160 to respectively report the current positions of the right and left pupils 102, 106.

At step 516, the microprocessor 110 may effect horizontal movement of the right and left pupils 102, 106. In order to do so, the microprocessor 110 may first compare the reported current positions of the right and left pupils 102, 106 with the location of the object, as determined in step 514. If, based on the comparison of the reported current positions and the determined location of the object, the microprocessor 110 determines that the reported current positions of the right and left pupils 102, 106 correspond to the determined location of the object, then the microprocessor 110 may determine that no change to the reported current positions of the right and the left pupils 102, 106 is necessary, and may allow the right and left pupils 102, 106 to remain in their reported current positions.

However, if based on the comparison of the reported current positions and the determined location of the object, the microprocessor 110 determines that the reported current positions of the right and left pupils 102, 106 do not correspond to the determined the location of the object, then the microprocessor determines that the positions of the right and left pupils 102, 106 should be changed to correspond to the determined location of the object. At this time, the microprocessor 110 may instruct the right pupil motor 150 to position the right pupil 102 such that the right pupil 102 is oriented (i.e., looking) towards the determined location of the object, as determined based on the first comparison of step 513. Similarly, the microprocessor 110 may instruct the left pupil motor 170 to position the left pupil 106 such that the left pupil 106 is oriented (i.e., looking) towards the determined the location of the object, as determined based on the second comparison of step 513.

The method then proceeds to step 503, and steps 503-516 are repeated. The method stops at 517. In this way, the location of the object is determined and the horizontal movement of the pupils 102, 106 is effected after every occurrence of a predetermined number of cycles, the predetermined number being equal to the predetermined value of the counter (e.g., five cycles). That is, the simulator allows for determination of the location of the object and for tracking of the object by the right and left pupils 102, 106 after every occurrence of a predetermined number of cycles. The method 500 stops when the tracking functionality is stopped. At this time, the microcontroller 110 places both the right and left pupils 102, 106 in their default positions.

In various embodiments, the simulator may be controlled to track objects, as discussed above, using only one pupil. For example, the simulator may be controlled to track objects using only the right pupil 102, while the left pupil 106 may be placed in any of the exemplary positions discussed below. Further, the left pupil 106 may be moved among the exemplary positions discussed below independently with respect to the tracking of the object by the right pupil 102.

Figure 6A:
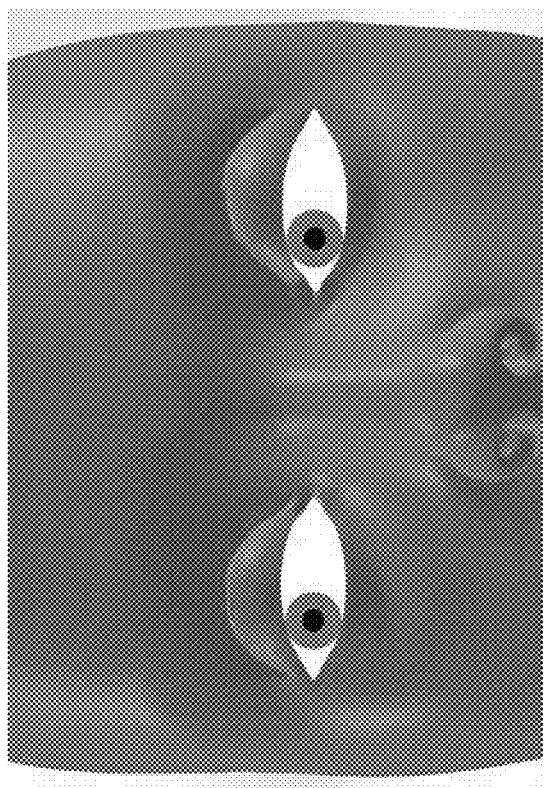
FIGS. 6A-6F illustrate exemplary positions of the right and left pupils according to various embodiments of the present disclosure.
Figure 6B:
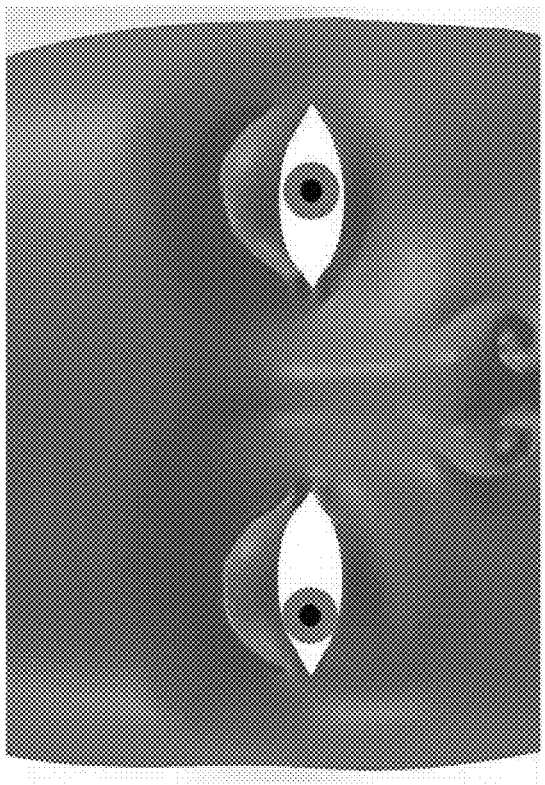
Figure 6D:
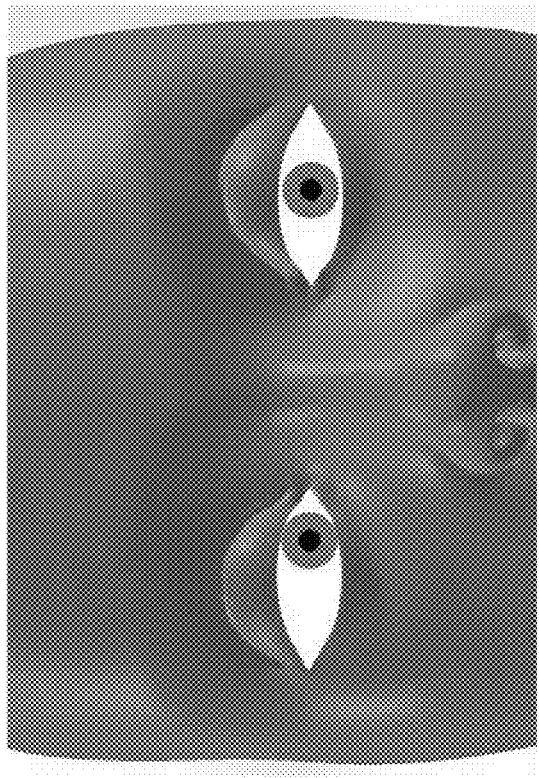
Figure 6C:
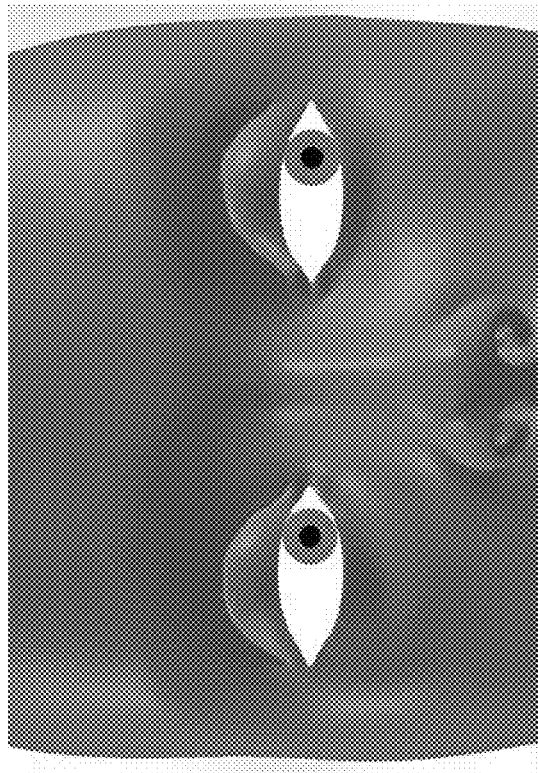
Figure 6F:
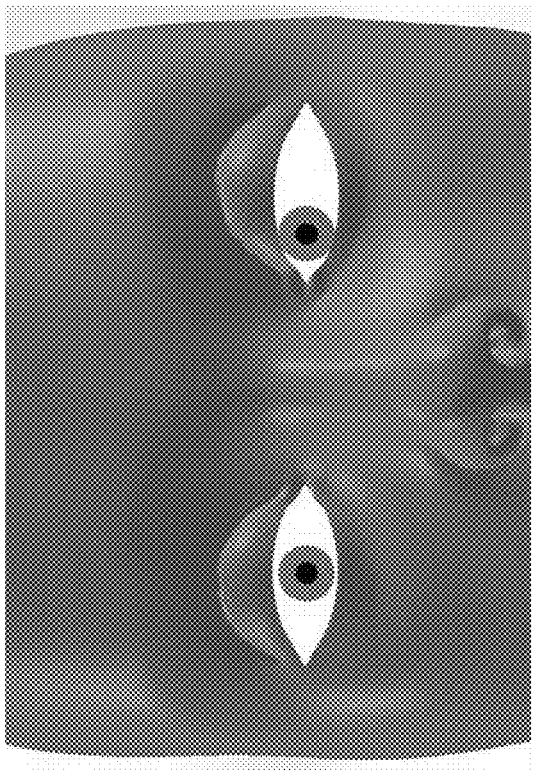
Figure 6E:
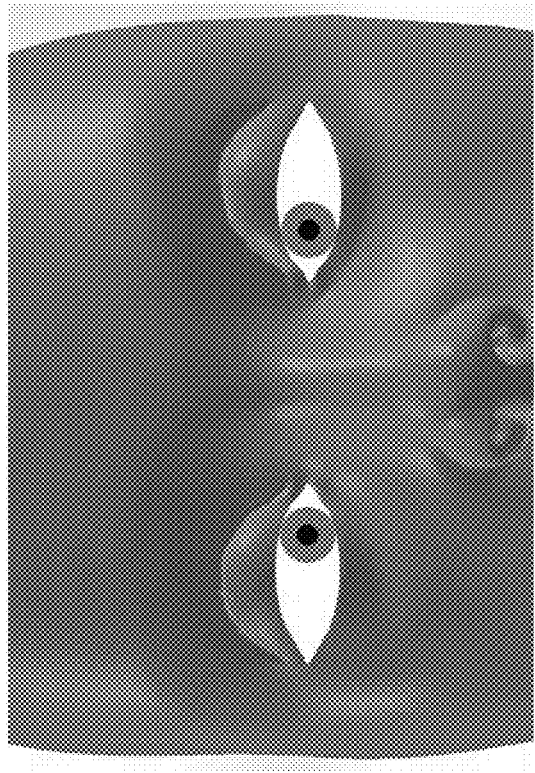

FIGS. 6A-6F illustrate exemplary positions of the right and left pupils 102, 106 according to various embodiments of the present disclosure. Both the above methods 400, 500 may be used to effect the positions of the right and left pupils 102, 106 illustrated in FIGS. 6A-6F. FIG. 6A illustrates simulation of healthy eyes tracking an object placed to the right of the simulator 200 in front of the IR sensor 120. As seen from FIG. 6A, both the right and left pupils 102, 106 are oriented (i.e., looking) towards the object in front of the IR sensor 120. Similarly, FIG. 6C illustrates simulation of healthy eyes tracking an object placed to the left of the simulator 200 in front of the IR sensor 122. As seen from FIG. 6C, both the right and left pupils 102, 106 are oriented (i.e., looking) towards the object in front of the IR sensor 122. FIG. 6E illustrates simulation of healthy eyes tracking an object placed in front of the simulator 200 in front of the IR sensor 121. As seen from FIG. 6C, both the right and left pupils 102, 106 converge to be oriented (i.e., looking) towards the object in front of the IR sensor 121.

FIGS. 6B, 6D, and 6F illustrate simulations of impaired eyes and their inability to properly track an object placed in front of the simulator 200. In various embodiments, the simulated positions of the right and left pupils 102, 106 illustrated in FIGS. 6B, 6D, and 6F may be effected by running pre-programmed routines to simulate conditions of impaired eyes. For example, FIG. 6B illustrates simulation of impaired eyes and their inability to properly track an object placed to the right of the simulator 200 in front of the IR sensor 120. As seen from FIG. 6B, the right pupil 102 is oriented (i.e., looking) towards and properly tracks the object in front of the IR sensor 120, but the left pupil 106 remains in its default position and appears to be looking straight ahead. Similarly, FIG. 6D illustrates simulation of impaired eyes and their inability to properly track an object placed to the left of the simulator 200 in front of the IR sensor 122. As seen from FIG. 6D, the right pupil 102 is oriented (i.e., looking) towards and properly tracks the object in front of the IR sensor 122, but the left pupil 106 remains in its default position and appears to be looking straight ahead. The inability of the left pupil 106 to properly track the object, as illustrated in FIGS. 6B and 6D, is known as diplopia, and maybe exhibited by running a pre-programmed diplopia routine for the left eye. FIG. 6F illustrates simulation of impaired eyes and their inability to properly track an object placed in front of the IR sensor 121 of the simulator 200. As seen from FIG. 6F, the left pupil 106 is oriented (i.e., looking) towards and properly tracks the object in front of the IR sensor 121, but the right pupil 102 remains in its default position and appears to be looking straight ahead. The inability of the right pupil 102 to properly track the object, as illustrated in FIG. 6F, maybe exhibited by running a pre-programmed routine for the right eye.

In various embodiments, the pre-programmed routines may be stored on memory 180 or on an external memory (not shown). An operator of the simulator 200 may use the input interface 190 to select a pre-programmed routine to be run by the microprocessor 110. Based on the inputs received at the input interface 190, the microprocessor 110 may retrieve and execute the selected pre-programmed routine from the memory 180 or the external memory. The input interface 190 may be directly connected to the microprocessor 110 or maybe connected to the microprocessor 110 via another central processing unit.

Vertical Movement: As discussed above, the microcontroller 110 may effect movement of the right and left pupils 102, 106 for tracking objects in the horizontal direction. Similarly, the microcontroller 110 may also effect movement of the right and left pupils 102, 106 for tracking objects in the vertical direction. Simulation of vertical movement of the right and left pupils 102, 106 in accordance with placement and movement of an object (e.g., pencil, finger, etc.) will now be described. Simulating vertical movement includes placing the object in front of the simulator and moving the object in a vertical plane. The simulator senses the presence and the movement of the object using the five IR sensors 120, 121, 122, 123, 124 and the four IR transmitters 130, 131, 132, 133, and allows for corresponding vertical movements of the right and left pupils 102, 106. In various embodiments, the vertical movement of the right and left pupils 102, 106 may be controlled such that the right and left pupils 102, 106 move together. Alternatively, in various embodiments, the vertical movement of the right pupil 102 is controlled independently from the vertical movement of the left pupil 106.

Figure 7:
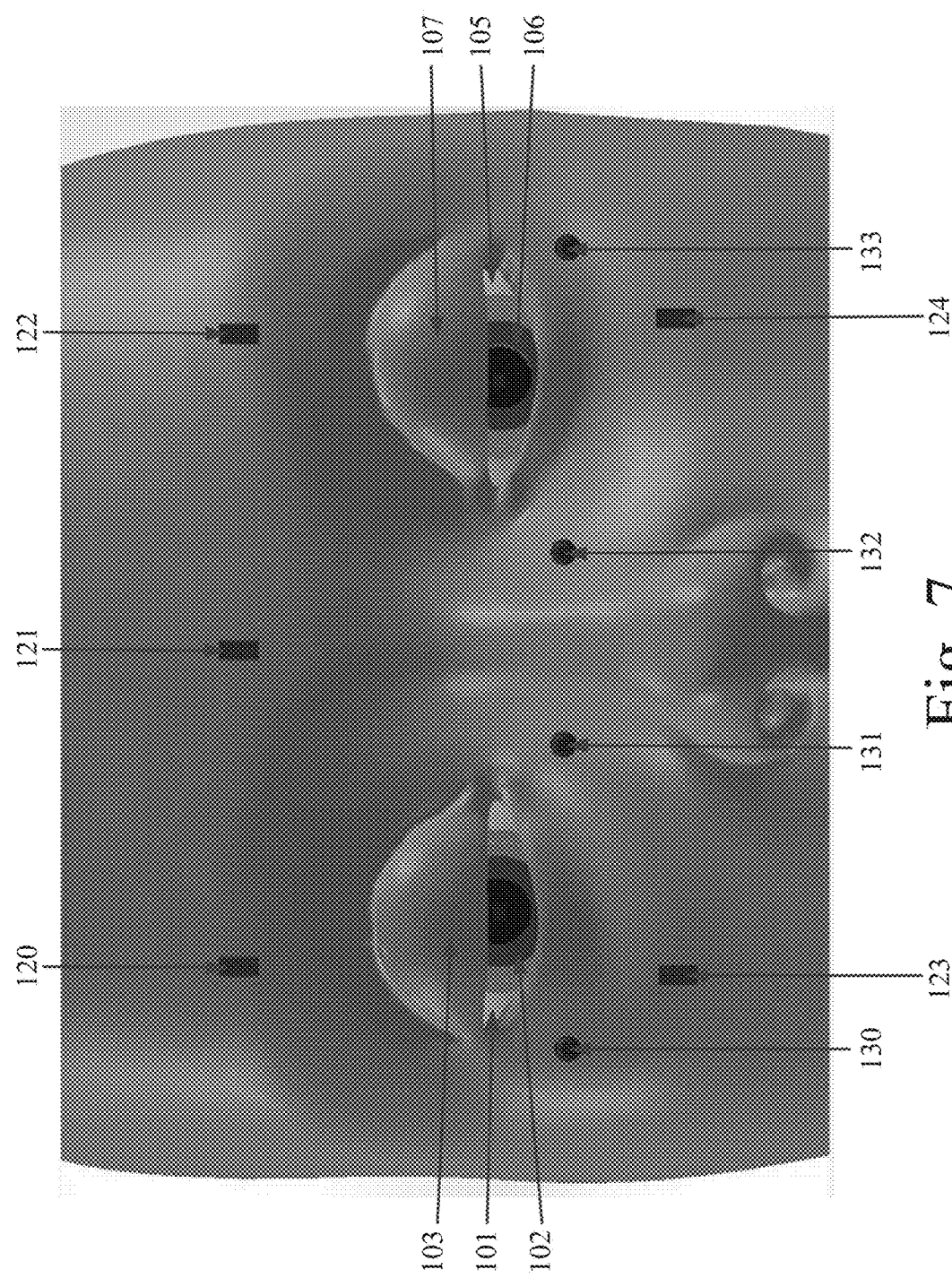
FIG. 7 illustrates a simulator 700 including the exemplary multipurpose eye motion trainer according to various embodiments of the present disclosure.

FIG. 7 illustrates a simulator 700 including the exemplary multipurpose eye motion trainer according to various embodiments of the present disclosure. The simulator 700 may be a manikin in the form of a human face, and may include an eye assembly. The eye assembly may include the above discussed right and left eyes 101, 105, and associated circuitry to control functions to be performed by the right and left pupils 102, 106. The associated circuitry for simulation of vertical movement may include five IR sensors 120, 121, 122, 123, 124, and four infrared (IR) transmitters 130, 131, 132, 133 that are electrically controlled by the microcontroller 110. Similar to the previously discussed simulator 200, the IR sensors and the IR transmitters of the simulator 700 may be placed under silicone skin (with special openings) of the simulator 700. This allows the simulator 700 to appear more lifelike.

In various embodiments, the IR sensors 120, 121, 122, may be placed above the eyes 101, 105 and the IR sensors 123, 124 may be placed below the 101, 105. For example, as shown in FIG. 7, the IR sensors 120, 121, 122 may be placed in a horizontal plane above the horizontal plane that includes the right and left eyes 101, 105, and the IR sensors 123, 124 may be placed in a horizontal plane below the horizontal plane that includes the right and left eyes 101, 105. Also, the IR sensors may be arranged such that IR sensors 120 and 123 share a first vertical plane and IR sensors 122 and 124 share a second vertical plane. The IR transmitters 130, 131, 132, 133 may be placed in a horizontal plane in close proximity to the right and left eyes 101, 105. For example, as shown in FIG. 7, the IR transmitters 130, 131, 132, 133 may be placed in a horizontal plane near the horizontal plane that includes the right and left eyes 101, 105. In various embodiments, the eye movement and/or eye tracking is simulated using the IR sensors 120, 121, 122, 123, 124 and the IR transmitters 130, 131, 132, 133.

One or more of the five IR sensors 120, 121, 122 may be coupled to the sense IR response signals originating from one or more of the four IR transmitters 130, 131, 132, 133 to form respective sensor-transmitter pairs. For example, in the present embodiment for vertical movement, the IR sensors 120, 123 may be coupled to sense IR response signals resulting from IR transmissions from the IR transmitter 130. Additionally or alternatively, the IR sensors 120, 123 may be coupled to sense IR response signals resulting from IR transmissions from the IR transmitter 131. Also, the IR sensors 122, 124 may be coupled to sense IR response signals resulting from IR transmissions from the IR transmitter 133. Additionally or alternatively, the IR sensors 122, 124 may be coupled to sense IR response signals resulting from IR transmissions from the IR transmitter 132. An IR sensor may be coupled to an IR transmitter by tuning the sensing frequency of the IR sensor to the transmitting modulated frequency of the IR transmitter and/or by positioning the IR sensor in close proximity to the IR transmitter. The tuning of the sensing frequency to the transmitting modulated frequency results in the IR sensor being isolated from environmental conditions so as to allow accurate sensing of the IR response signal by the IR sensor. Of course, any of the one or more IR sensors may be coupled with any of the one or more IR transmitters to effect the vertical movement of the right and left pupils 102, 106.

Figure 8B:
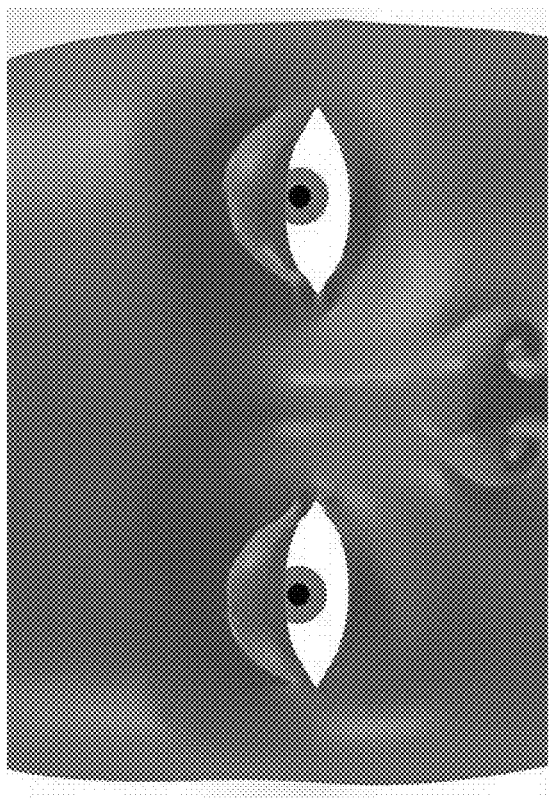
FIGS. 8A-8C illustrate an exemplary range of vertical movement for the right and left pupils according to various embodiments of the present disclosure.
Figure 8A:
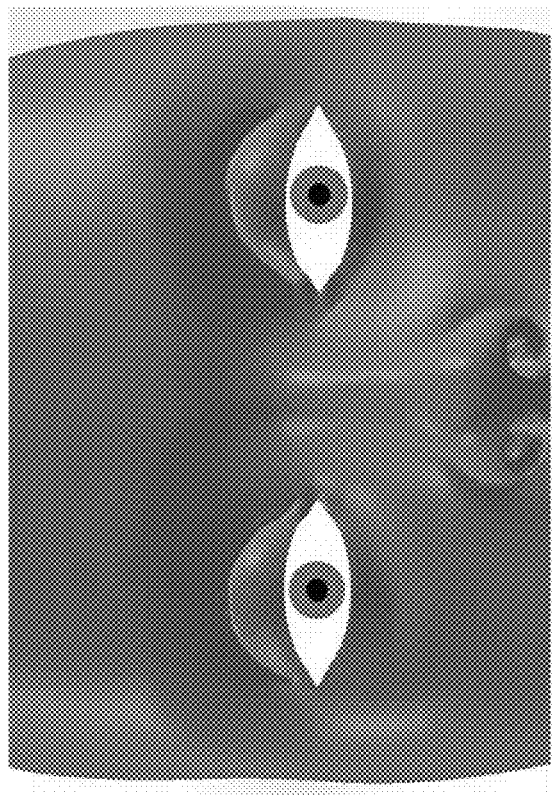
Figure 8C:
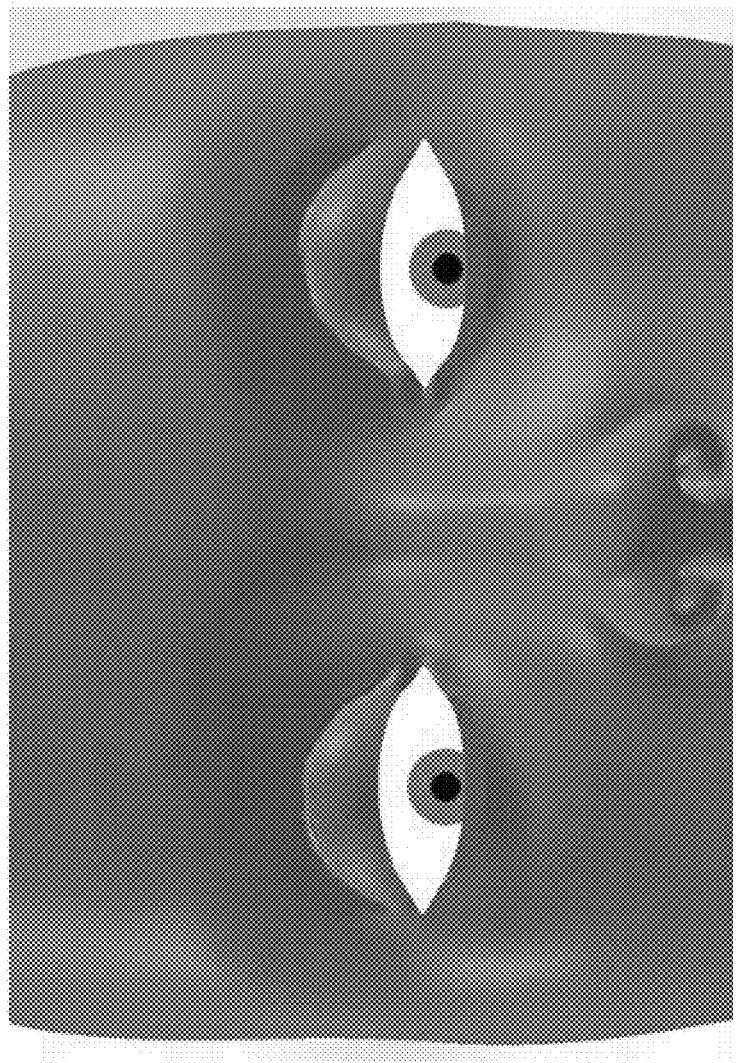

FIGS. 8A-8C illustrate an exemplary range of vertical movement for the right and left pupils 102, 106 according to various embodiments of the present disclosure. In various embodiments, the total range of vertical movement for each of the right and left pupils 102, 106 may include three positions. The three positions may include a default position, an upwards position, and a downwards position. FIG. 8A illustrates the default positions, in which the right and left pupils 102, 106 may be placed to simulate a person looking substantially straight ahead. FIG. 8B illustrates the upwards position, in which the right and left pupils 102, 106 may be placed to simulate a person looking substantially upwards. Finally, FIG. 8C illustrates the downwards position, in which the right and left pupils 102, 106 may be placed to simulate a person looking substantially downwards.

As indicated previously, the simulation of vertical movement of the right and left pupils 102, 106 may be conducted in two modes—the joint tracking mode or the independent tracking mode. In the joint tracking mode, both the right and the left pupils 102, 106 may be controlled together such that the right and left pupils 102, 106 are displaced jointly in the same direction. Alternatively, in the independent tracking mode, the right pupil 102 may be controlled independently with respect to the left pupil 106 such that the right pupil 102 may move in a different direction with respect to the left pupil 106. For example, two objects may be placed in front of the simulator 200, such that a first object is in front of the IR sensor 120 and a second object is in front of the IR sensor 124. In this case, the right pupil 102 may be rotated to the upwards position to be oriented (i.e., looking) towards the object in front of the IR sensor 120, and the left pupil 106 may be rotated to the downwards position to be oriented (i.e., looking) towards the object in front of the IR sensor 124. Finally, as discussed below in further detail, the right and left pupils 102, 106 may be placed in the default position based on a comparison of the values of the sensed IR response signals.

Figure 9:
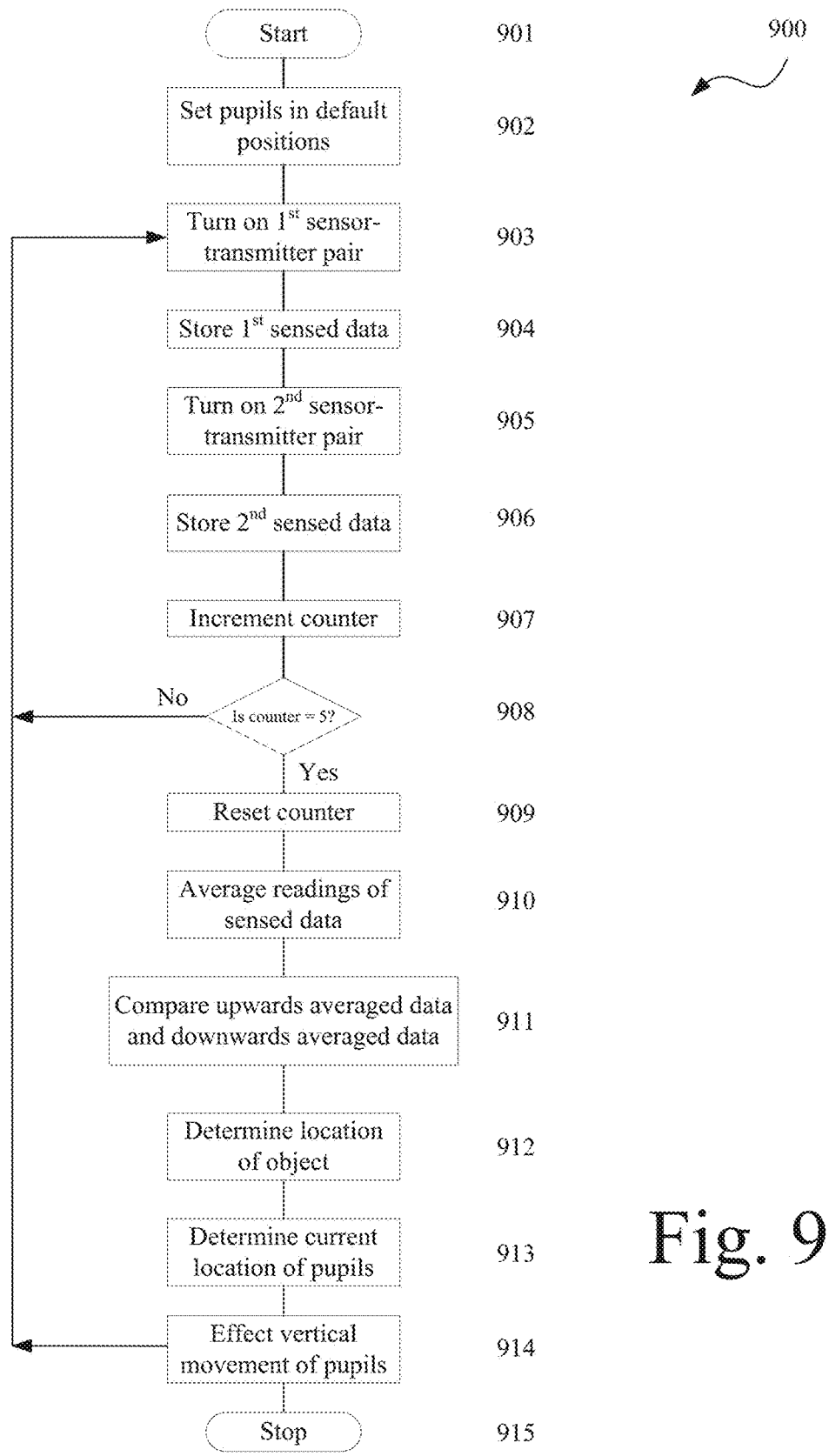
FIG. 9 illustrates an exemplary method 900 for performing simulation of vertical movements in the joint tracking mode according to various embodiments of the present disclosure.

FIG. 9 illustrates an exemplary method 900 for performing simulation of vertical movements in the joint tracking mode according to various embodiments of the present disclosure. The method starts at step 901. At step 902, the microcontroller 110 places both the right and left pupils 102, 106 in the default positions such that both eyes appear to be looking straight ahead. For example, the microcontroller 110 may instruct the right pupil motor 150 to place the right pupil 102 in its default position and may instruct the left pupil motor 170 to place the left pupil 106 in its default position. At this time, an object (e.g., finger, pencil, etc.) may be placed in front of the simulator.

At step 903, the microcontroller 110 turns on the first coupled sensor-transmitter pair of the IR sensors 120, 123 and the IR transmitter 130. In various embodiments, when the first coupled sensor-transmitter pair is turned on, the IR transmitter 130 may transmit a burst of frequency modulated IR radiations. The burst may include 100 pulses, each pulse having a period of about 2 μs and a duty cycle of 50%. The transmitted pulses of IR radiations may reflect off the surface of the object in front of the simulator and the resulting IR response signals are separately sensed by the IR sensors 120, 123. As previously discussed, the IR sensors 120, 123 may sense the IR response signals and record respective values corresponding to the respectively sensed intensities of the reflected IR response signals. At this time, the first coupled sensor-transmitter pair of the IR sensors 120, 123 and the IR transmitter 130 may be turned off.

At step 904, the microprocessor 110 may store the IR response data sensed by the IR sensors 120, 123 in the electronic memory 180 as a reading of first-upwards and first-downwards sensed data. For example, the microprocessor 110 may store the IR response data sensed by the IR sensor 120 as first-upwards sensed data and may store the IR response data sensed by the IR sensor 123 as first-downwards sensed data.

At step 905, the microcontroller 110 may turn on the second coupled sensor-transmitter pair of the IR sensors 122, 124 and the IR transmitter 133. In various embodiments, when the second coupled sensor-transmitter pair is turned on, the IR transmitter 133 may transmit a burst of frequency modulated IR radiations. The burst may include 100 pulses, each pulse having a period of about 2 μs and a duty cycle of 50%. The transmitted pulses of IR radiations may reflect off the surface of the object in front of the simulator and the resulting IR response signals are separately sensed by the IR sensors 122, 124. As previously discussed, the IR sensors 122, 124 may sense the IR response signals and record respective values corresponding to the respectively sensed intensities of the reflected IR response signals. At this time, the second coupled sensor-transmitter pair of the IR sensors 122, 124 and the IR transmitter 133 may be turned off.

At step 906, the microprocessor 110 may store the IR response data sensed by the IR sensors 122, 124 in the electronic memory 180 as a reading of second-upwards and second-downwards sensed data. For example, the microprocessor 110 may store the IR response data sensed by the IR sensor 122 as second-upwards sensed data and may store the IR response data sensed by the IR sensor 124 as second-downwards sensed data.

If the one or more IR sensors are additionally paired with one or more IR transmitters, than those sensor-transmitter pairs may be turned on and their data be recorded similarly as discussed in steps 903-906. For example, if one or more of the IR sensors 120, 123 are paired with IR transmitter 131 to form a third sensor-transmitter pair or of one or more of the IR sensors 122, 124 are paired with IR transmitter 132, then these sensor transmitter pairs may be turned on and the corresponding data be recorded.

At step 907, once all the sensor-transmitter pairs have been cycled through and sensed data from all the IR sensors has been recorded, the microprocessor 110 increments a counter having an initial value of zero. That is, at step 907, the microprocessor 110 increments the counter to have a value of 1. This signifies that one cycle of collecting and recording data from all the IR sensors-transmitter pairs has been completed.

At step 908, the microprocessor 110 determines whether the counter value is equal to a predetermined value. This predetermined value may be a predetermined number of cycles for collecting and recording data from all the IR sensors after which the microprocessor 110 processes the recorded data to determine the location of the object and to effect corresponding movement of the right and left pupils 102, 106. In the present embodiment, the predetermined value is set to 5. That is, the data is collected and recorded from all the IR sensors for five cycles after which the microprocessor 110 processes the recorded data to determine the location of the object and to effect corresponding movement of the right and left pupils 102, 106. However, any integer value greater than zero may be used as the predetermined value.

If the microprocessor 110 determines that the counter value is not equal to the predetermined value, then the method moves to step 903. Alternatively, if the microprocessor 110 determines that the counter value is equal to the predetermined value, the method moves to step 909. At this point, the microprocessor 110 has determined that five cycles of collecting and recording data from all the IR sensors has been completed.

At step 909, the microprocessor 110 resets the counter such that the counter value is equal to zero.

At step 910, the microprocessor 110 averages the five readings of the first-upwards sensed data and records the results as average first-upwards sensed data, averages the three readings of the first-downwards sensed data and records the results as average first-downwards sensed data, averages the three readings of the second-upwards sensed data and records the results as average second-upwards sensed data, and averages the three readings of the second-downwards sensed data and records the results as average second-downwards sensed data. In other words, the microprocessor 110 calculates the average first-upwards sensed data, the average first-downwards sensed data, the average second-upwards sensed data, and the average second-downwards sensed data.

At step 911, the microprocessor 110 compares the values of the average first-upwards sensed data, the average second-upwards sensed data, the average first-downwards sensed data, and the average second-downwards sensed data. Based on the comparison, the microprocessor 110 determines which average sensed data has the highest value.

At step 912, the microprocessor 110 determines the location of the object to be in front of the IR sensor associated with the average sensed data having the highest value. For example, if at step 911, the microprocessor 110 determines that the average first-upwards sensed data or the average second-upwards has the highest value, then the microprocessor 110 determines that the location of the object is in front of either IR sensor 120 or IR sensor 122. That is, the microprocessor 110 determines that the location of the object is in the upwards direction with respect to the default positions of the right and left pupils 102, 106. Alternatively, if at step 911, the microprocessor 110 determines that the average first-downwards sensed data or the average second-downwards sensed data has the highest value, then the microprocessor 110 determines that the location of the object is in front of the IR sensor 123 or IR sensor 124. That is, the microprocessor 110 determines that the location of the object is in the downwards direction with respect to the default positions of the right and left pupils 102, 106.

Also, the microcontroller 110 may calculate a difference between the two greatest average values, and may determine that the object is placed between the two different IR sensors associated with the two greatest average values when the calculated difference is less than a predetermined threshold value. For example, if at step 911, the microprocessor 110 determines that the average first-upwards (or second-upwards) sensed data and the average first-downwards (or second-downwards) sensed data are the two greatest average values, then the microprocessor 110 may calculate a difference between the average first-upwards (or second-upwards) sensed data and the average first-downwards (or second-downwards) sensed data. The microprocessor 110 may then determine that the vertical location of the object is in between IR sensors 120 and 123 (or between IR sensors 122 and 124) when the calculated difference is less than a predetermined threshold value.

Once the microprocessor 110 has determined the location of the object, at step 913, the microprocessor 110 may determine the current positions of the right and left pupils 102, 106. In various embodiments, the microprocessor 110 may instruct the right and left pupil sensors 240, 260 to respectively report the current positions of the right and left pupils 102, 106.

At step 914, the microprocessor 110 may effect vertical movement of the right and left pupils 102, 106. In order to do so, the microprocessor 110 may first compare the reported current positions of the right and left pupils 102, 106 with the location of the object, as determined in step 912. If, based on the comparison of the reported current positions and the determined location of the object, the microprocessor 110 determines that the reported current positions of the right and left pupils 102, 106 correspond to the determined location of the object, then the microprocessor 110 may determine that no change to the reported current positions of the right and the left pupils 102, 106 is necessary, and may allow the right and left pupils 102, 106 to remain in their reported current positions.

However, if based on the comparison of the reported current positions and the determined location of the object, the microprocessor 110 determines that the reported current positions of the right and left pupils 102, 106 do not correspond to the determined location of the object, then the microprocessor determines that the positions of the right and left pupils 102, 106 should be changed to correspond to the determined location of the object. At this time, the microprocessor 110 may instruct the right and left pupil motors 250, 270 to position the right and left pupils 102, 106 such that the right and left pupils 102, 106 are oriented (i.e., looking) towards the determined location of the object.

The method then proceeds to step 903, and steps 903-914 are repeated. The method stops at 915. In this way, the location of the object is determined and the vertical movement of the pupils 102, 106 is effected after every occurrence of a predetermined number of cycles, the predetermined number being equal to the predetermined value of the counter (e.g., five cycles). That is, the simulator 700 allows for determination of the location of the object and for tracking of the object by the right and left pupils 102, 106 after every occurrence of a predetermined number of cycles. The method 900 stops when the tracking functionality is stopped. At this time, the microcontroller 110 places both the right and left pupils 102, 106 in their default positions.

Figure 10:
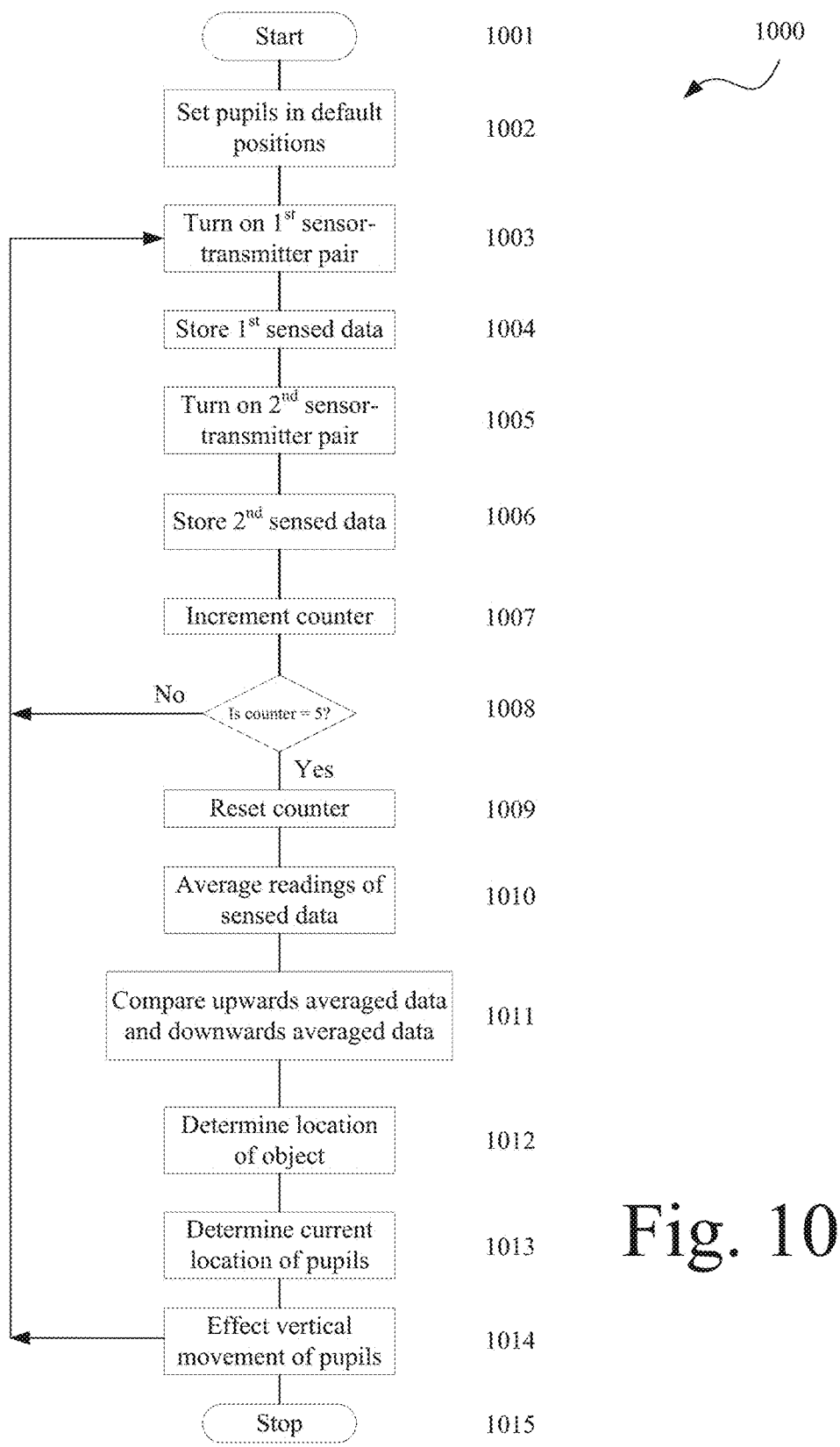
FIG. 10 illustrates an exemplary method 1000 for performing simulation of vertical movements in the independent tracking mode according to various embodiments of the present disclosure.

FIG. 10 illustrates an exemplary method 1000 for performing simulation of vertical movements in the independent tracking mode according to various embodiments of the present disclosure. In the independent tracking mode, the microprocessor 110 determines and effects the position of the right pupil 102 independently from the position of the left pupil 106. In various embodiments, the microprocessor 110 effects the position of the right pupil 102 based on the readings from the first sensor-transmitter pair. That is, the microprocessor 110 determines the position of the right pupil 102 based on the readings from the sensor-transmitter pair including IR sensors 120, 123 and IR transmitter 130 (and the readings from the sensor-transmitter pair including IR sensors 120, 123 and IR transmitter 131, if paired). Similarly, the microprocessor 110 effects the position of the left pupil 106 based on the readings from the second sensor-transmitter pair. That is, the microprocessor 110 determines the position of the left pupil 106 based on the readings from the sensor-transmitter pair including IR sensors 122, 124 and IR transmitter 133 (and the readings from the sensor-transmitter pair including IR sensors 122, 124 and IR transmitter 132, if paired).

Steps 1001-1010 of method 1000 are identical to the steps 901-910 of method 900 discussed above with respect to FIG. 9. As such, description of the steps will be omitted in the description of the method 1000.

At step 1011, the microprocessor 110 first compares the values of the average first-upwards sensed data with the average first-downwards sensed data to determine which average sensed data has the highest value. As discussed below, the microprocessor 110 effects the position of the right pupil 102 based on the determined highest value from the first comparison. Second, the microprocessor 110 compares the values of the average second-upwards sensed data with the average second-downwards sensed data to determine which average sensed data has the highest value. As discussed below, the microprocessor 110 effects the position of the left pupil 106 based on the determined highest value from the second comparison.

For positioning the right pupil 102, at step 1012, the microprocessor 110 determines the location of the object to be in front of the IR sensor associated with the average sensed data having the highest value. For example, if at step 1011, the microprocessor 110 determines that the average first-upwards sensed data has the highest value, then the microprocessor 110 determines that the location of the object is in front of the IR sensor 120. Similarly, if at step 1011, the microprocessor 110 determines that the average first-downwards sensed data has the highest value, then the microprocessor 110 determines that the location of the object is in front of the IR sensor 123. Similarly, for positioning the left pupil 106, at step 1012, the microprocessor 110 determines the location of the object to be in front of the IR sensor associated with the average sensed data having the highest value. For example, if at step 1011, the microprocessor 110 determines that the average second-upwards sensed data has the highest value, then the microprocessor 110 determines that the location of the object is in front of the IR sensor 122. Similarly, if at step 1011, the microprocessor 110 determines that the average second-downwards sensed data has the highest value, then the microprocessor 110 determines that the location of the object is in front of the IR sensor 124. Also, as discussed previously, the microcontroller 110 may calculate a difference between two different values recorded by two different IR sensors, and may determine that the object is placed between the two different IR sensors when the calculated difference is less than a predetermined threshold value.

Once the microprocessor 110 has determined the location of the object, at step 1013, the microprocessor 110 may determine the current positions of the right and left pupils 102, 106. In various embodiments, the microprocessor 110 may instruct the right and left pupil sensors 240, 260 to respectively report the current positions of the right and left pupils 102, 106.

At step 1014, the microprocessor 110 may effect vertical movement of the right and left pupils 102, 106. In order to do so, the microprocessor 110 may first compare the reported current positions of the right and left pupils 102, 106 with the location of the object, as determined in step 1012. If, based on the comparison of the reported current positions and the determined location of the object, the microprocessor 110 determines that the reported current positions of the right and left pupils 102, 106 correspond to the determined location of the object, then the microprocessor 110 may determine that no change to the reported current positions of the right and the left pupils 102, 106 is necessary, and may allow the right and left pupils 102, 106 to remain in their reported current positions.

However, if based on the comparison of the reported current positions and the determined location of the object, the microprocessor 110 determines that the reported current positions of the right and left pupils 102, 106 do not correspond to the determined location of the object, then the microprocessor determines that the positions of the right and left pupils 102, 106 should be changed to correspond to the determined location of the object. At this time, the microprocessor 110 may instruct the right pupil motor 250 to position the right pupil 102 such that the right pupil 102 is oriented (i.e., looking) towards the determined location of the object, as determined based on the first comparison of step 1011. Similarly, the microprocessor 110 may instruct the left pupil motor 270 to position the left pupil 106 such that the left pupil 106 is oriented (i.e., looking) towards the determined the location of the object, as determined based on the second comparison of step 1011.

The method then proceeds to step 1003, and steps 1003-1014 are repeated. In this way, the location of the object is determined and the vertical movement of the pupils 102, 106 is effected after every occurrence of a predetermined number of cycles, the predetermined number being equal to the predetermined value of the counter (e.g., five cycles). That is, the simulator allows for determination of the location of the object and for tracking of the object by the right and left pupils 102, 106 after every occurrence of a predetermined number of cycles. The method 1000 stops at step 1015 when the tracking functionality is stopped. At this time, the microcontroller 110 places both the right and left pupils 102, 106 in their default positions.

In various embodiments of the methods 900, 1000, the microcontroller 110 may, in addition to comparing the calculated average sensed data values, calculate a difference between the average sensed data values to determine the location of the object. For example, with respect to method 1000, the microcontroller 110 may calculate a difference between the average first-upwards (and/or second-upwards) sensed data and the average first-downwards (and/or second-downwards) sensed data. The microcontroller 110 may then compare the calculated difference with a predetermined threshold value. Based on this comparison, if the microcontroller 110 determines that the calculated difference is greater than the predetermined threshold value, then the method proceeds to step 1012, as discussed above with respect to FIG. 10. However, if the microcontroller 110 determines that the calculated difference is equal to or lower than the predetermined threshold value, then the microcontroller 110 may determine that the object is located substantially in between the IR sensor 120 (or IR sensor 122) and IR sensor 123 (or IR sensor 124). Based on this determination of the location of the object, the microcontroller 110 may place the right and left pupils 102, 106 in the default positions to be oriented (i.e., looking) towards that determine location of the object.

In various embodiments, the simulator may be controlled to track objects, as discussed above, using only one pupil. For example, the simulator may be controlled to track objects using only the right pupil 102, while the left pupil 106 may be placed in any of the exemplary positions discussed below. Further, the left pupil 106 may be moved among the exemplary positions discussed below independently with respect to the tracking of the object by the right pupil 102.

In various embodiments, the simulated positions of the right and left pupils 102, 106 may be effected by running pre-programmed routines to simulate conditions of normal or impaired eyes. For example, similar to the conditions illustrated in FIGS. 6A-F, vertical positions of the right and left pupils 102, 106 may be effected by running pre-programmed routines to simulate conditions of normal or impaired eyes. In addition, a combination of horizontal and vertical positions of the right and left pupils 102, 106 may be effected by running pre-programmed routines to simulate rolling of the right and left pupils 102, 106 in a circular motion.

In various embodiments, the pre-programmed routines may be stored on memory 180 or on an external memory (not shown). An operator of the simulator 200 may use the input interface 190 to select a pre-programmed routine to be run by the microprocessor 110. Based on the inputs received at the input interface 190, the microprocessor 110 may retrieve and execute the selected pre-programmed routine from the memory 180 or the external memory. The input interface 190 may be directly connected to the microprocessor 110 or maybe connected to the microprocessor 110 via another central processing unit.

Pupillary Change: Pupillary change may be described as a physiological response in which the size of the iris of the pupil changes in response to light conditions sensed by the human nervous system. The change in the size of iris may be constriction or dilation. The size of the iris reduces during constriction and increases during dilation. Constriction occurs in high light (i.e., bright) conditions when the pupil allows a limited amount of light into the eye, and dilation occurs in low light (i.e., dark) conditions when the pupil allows more light into the eye. Pupillary change is an important medical indicator for healthy eyes in that healthy eyes exhibit consensual light reflex which occurs, for example, when the iris in one eye not directly stimulated reacts to stimulation of the iris in the other eye. In various embodiments, the presently disclosed simulator realistically replicates the change in size of an iris in a human eye in a way that is useful for medical educational and diagnostic purposes.

Figure 11A:
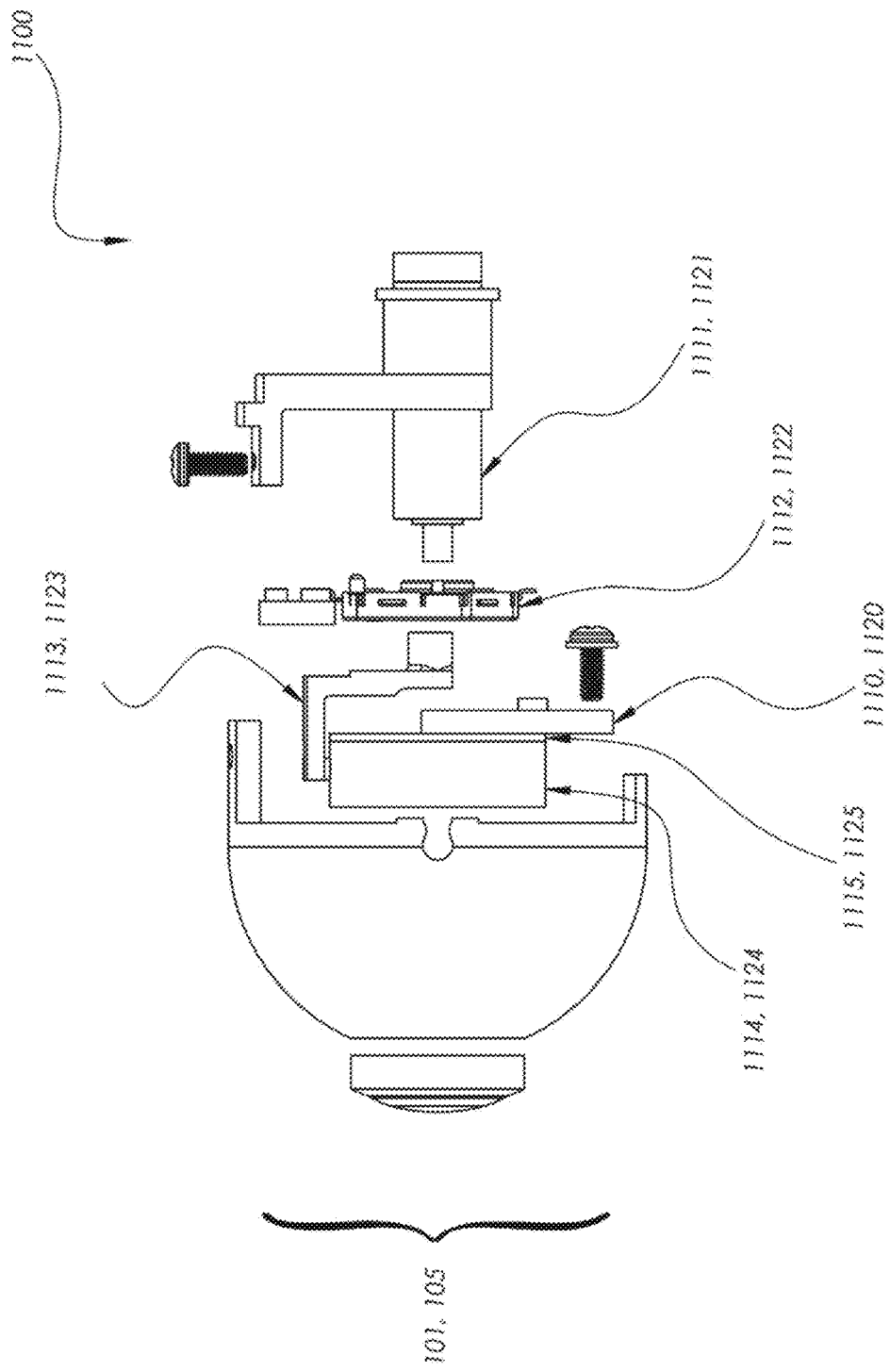
FIG. 11A illustrates an electro-mechanical block diagram 1100 of the simulator according to various embodiments of the present disclosure.

FIG. 11A illustrates an electro-mechanical block diagram 1100 of the simulator according to various embodiments of the present disclosure. The simulator (see FIG. 12) may be a manikin in the form of a human face, and may include the eye assembly discussed above. The eye assembly may include the right eye 101 of the simulator, the left eye 105 of the simulator, and associated circuitry to control functions to be performed by the right and left eyes 101, 105. For pupillary change functions, the simulator may include the microcontroller 110 electrically connected to a right light sensor 1110, a right iris motor 1111, a left light sensor 1120, and a left iris motor 1121 to actuate constriction or dilation. The right/left iris motors 1111, 1121 are respectively connected to right/left iris size sensors 1112, 1122 via right/left rotating arms 1113, 1123. The right/left rotating arms 1113, 1123 are respectively connected to right/left circular apertures 1114, 1124, which represent the right/left irises in the right/left eyes 101, 105. The right/left apertures 1114, 1124 are adjacently placed next to right/left pupil backgrounds 1115, 1125, respectively. In various embodiments, the electro-mechanical components to effect pupillary changes are coupled to each other coaxially.

Figure 11B:
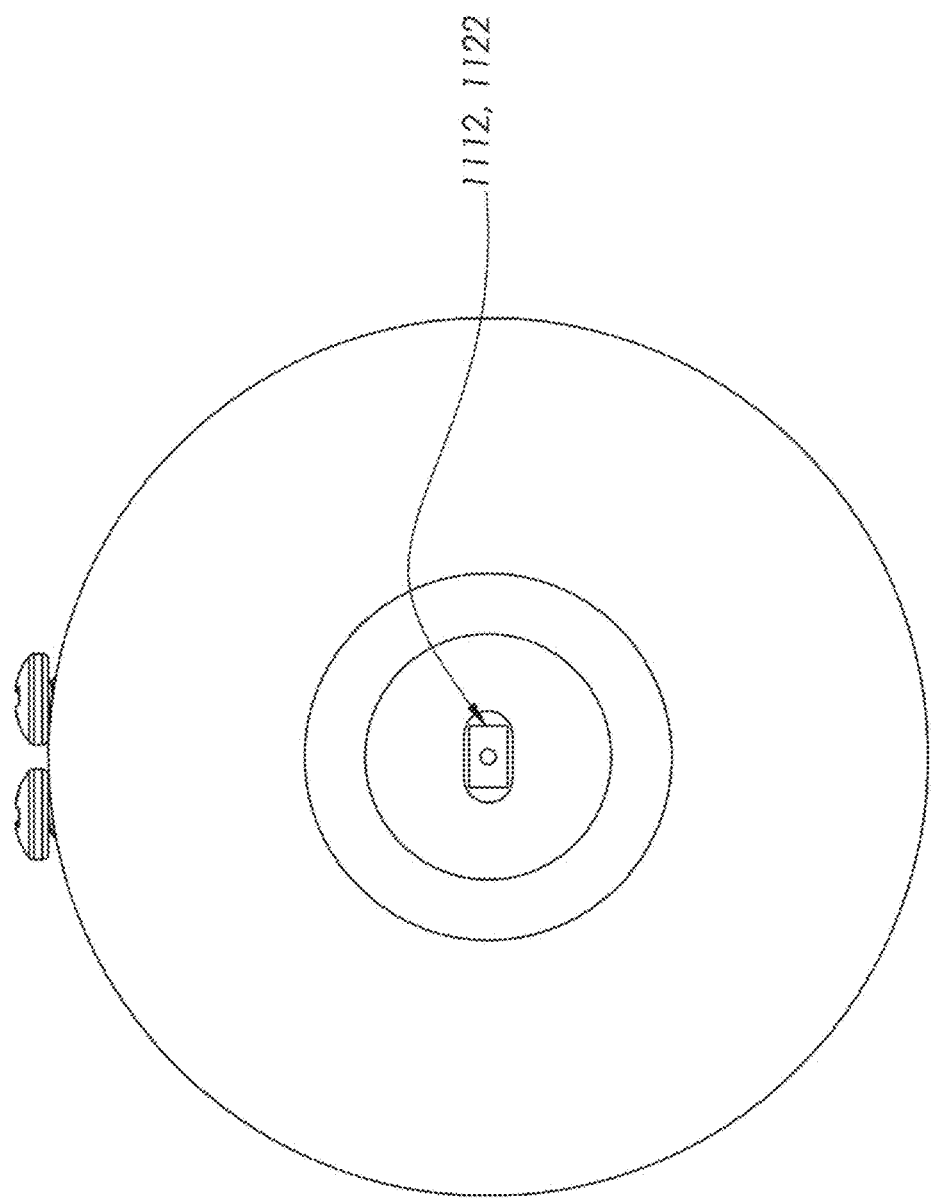
FIG. 11B illustrates an exemplary front view of an eye of the simulator according to various embodiments of the present disclosure.

As seen from FIG. 11B, the above components for actuating the constriction or dilation of the right and left apertures 1114, 1124 are placed inside the right and left eyes 101, 105. This allows the control associated with the constriction or dilation of the irises 1114, 1124 to be independent from the horizontal or vertical movements of the right and left pupils 102, 106 discussed above with respect to FIGS. 1-10. In various embodiments, the pupil dilation of each of the right and left eyes 101, 105 is controlled at least partially based on an amount of light received by the optical sensors 1110, 1120 positioned within the eyes. That is, based on the amount of light received by the optical sensors 1110, 1120, the microcontroller 110 activates the constriction or dilation of the irises 1114, 1124. In various embodiments, the rate of change or responsiveness of the irises can be slowed to simulate an abnormal medical condition that would result in slowed pupil constriction or dilation. In this manner, pupillary changes are simulated for medical and diagnostic purposes. A maximum size of the iris and/or the rate of change or dilation of the iris may be controlled by the control system illustrated in FIG. 11. The right and left eyes 101 can be independently constricted or dilated in some instances.

In various embodiments, the optical sensor 1110 senses the light conditions associated with an experienced by the right eye 101, and the optical sensor 1120 senses the light conditions associated with and experienced by the left eye 105. Upon sensing the light conditions, the optical sensors 1110, 1120 respective electrical signals transmit information regarding the sensed light conditions to the microprocessor 110. The microprocessor 110 receives the respective electrical signals, and processes the information regarding the sensed light conditions to determine whether to change the circular sizes of the right iris and/or the left iris 1114, 1124. In various embodiments, the microprocessor 110 may determine to change the circular size of the right iris 1114 jointly or independently with respect to the determination to change circular size of the left iris 1124.

The microprocessor 110 may send electrical signals to the right/left iris motors 1111, 1121 to actuate the increase or decrease in the circular size of the right iris and/or the left iris 1114, 1124. The shafts of the right/left iris motors 1111, 1121 may be respectively coupled to right/left rotating arms 1113, 1123 such that rotation of the motors effects rotation of the rotating arms. Further, the right/left rotating arms 1113, 1123 may be respectively coupled to the circular apertures that act as the right/left irises 1114, 1124 such that rotation of the rotating arms allows for increase or decrease in the size of the circular apertures. For example, when an iris motor (1111 or 1121) rotates in a first direction, it effects rotation of the rotating arm (1113 or 1123) to increase the circular size of a circular aperture (1114 or 1124). Similarly, when the iris motor (1111 or 1121) rotates in a second direction, it effects rotation of the rotating arm (1113 or 1123) to decrease the circular size of a circular aperture (1114 or 1124). The increase or decrease in the size of the circular apertures along with the pupil backgrounds 1115, 1125 visually simulates constriction or dilation of an iris in a human eye.

Figure 12A:
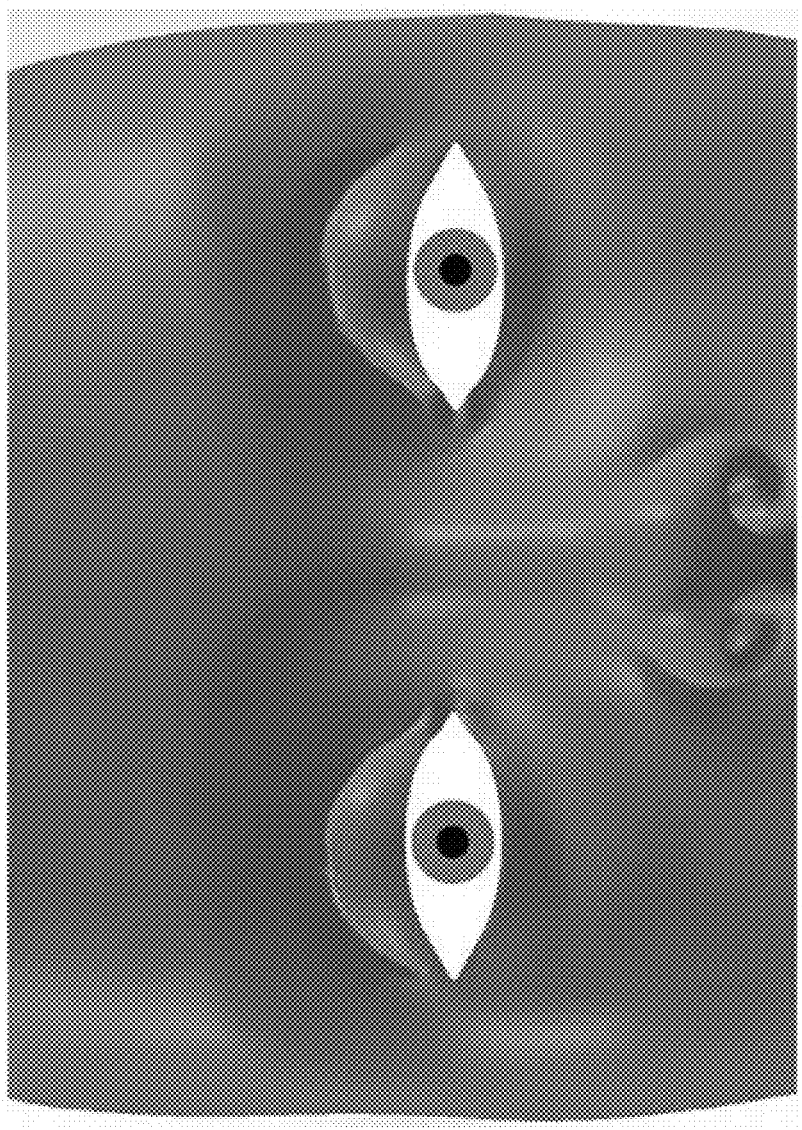
FIGS. 12A-12C illustrate exemplary changes in the size of the iris according to various embodiments of the present disclosure.
Figure 12C:
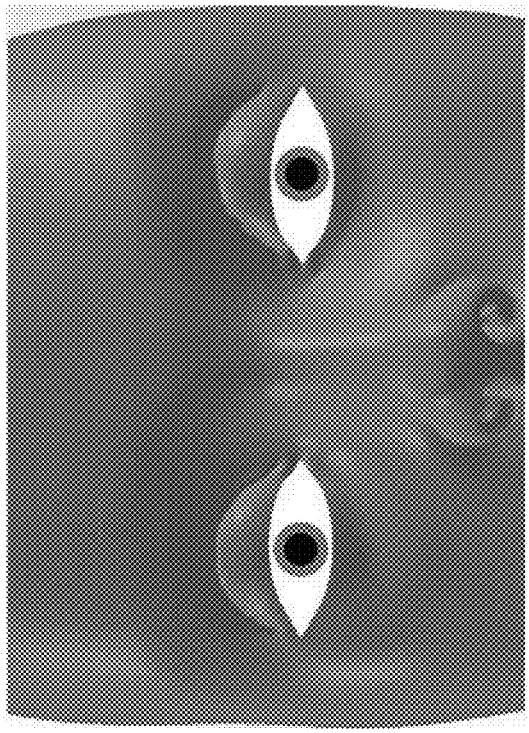
Figure 12B:
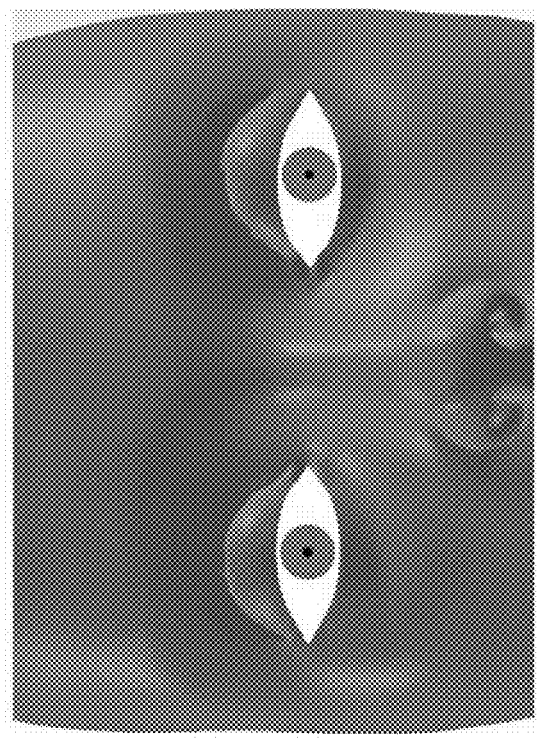

FIGS. 12A-12C illustrate exemplary changes in the size of the iris according to various embodiments of the present disclosure. The total range of change in the size of the iris may be from 1 mm in diameter when totally constricted to 8 mm in diameter when totally dilated. The total range may include three illustrated positions—a default size, a totally constricted size, and a totally dilated size. For example, FIG. 12A shows the default size of the iris, which may be about 4 mm in diameter. FIG. 12B illustrates the totally constricted size of the iris, which may be about 1 mm in diameter. Finally, FIG. 12C illustrates the totally dilated size of the iris, which may be about 8 mm in diameter.

Figure 13:
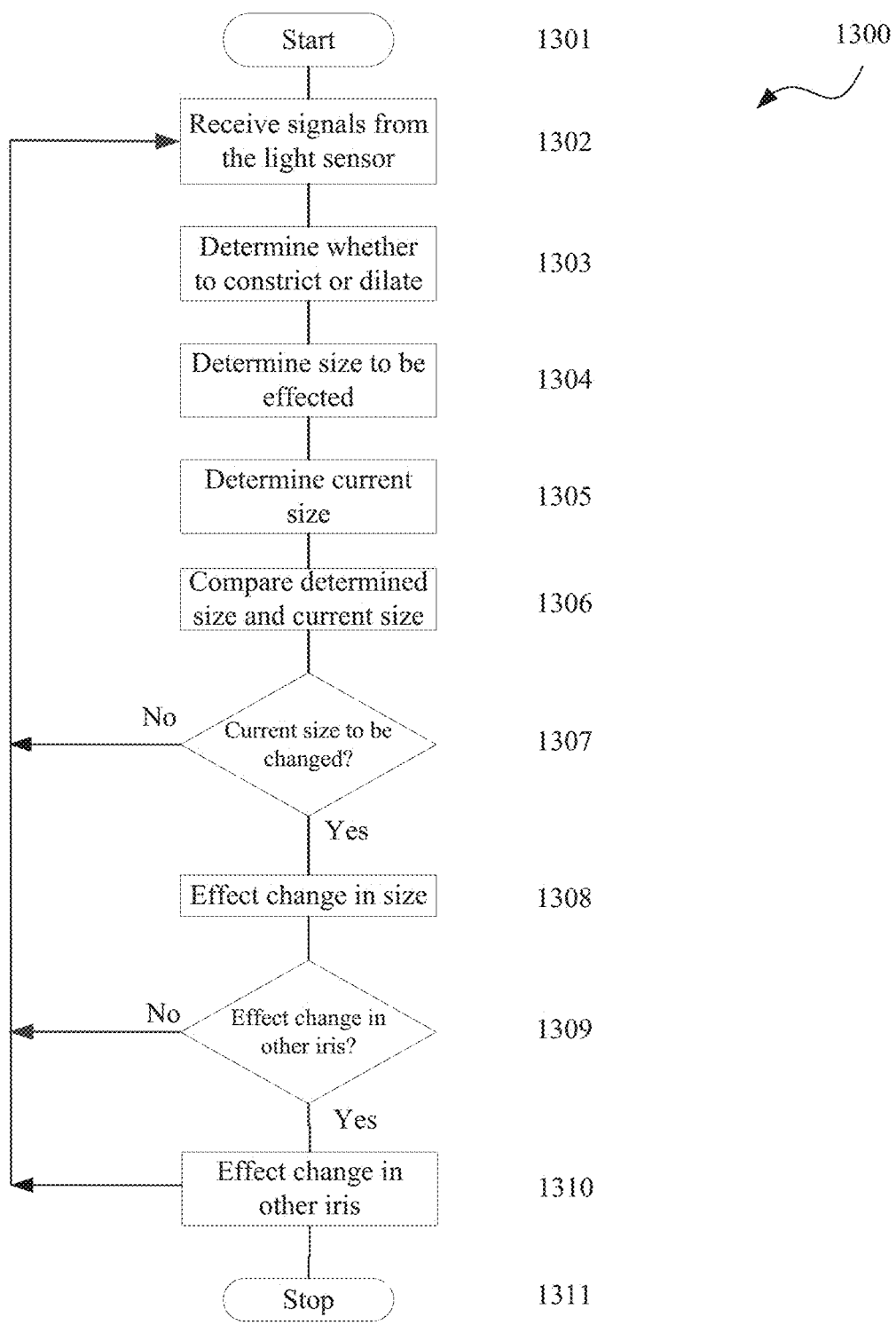
FIG. 13 illustrates an exemplary method 1300 for performing simulation of pupillary changes according to various embodiments of the present disclosure.

FIG. 13 illustrates an exemplary method 1300 for performing simulation of pupillary changes for a given eye (right or left) according to various embodiments of the present disclosure. The method starts at step 1301. In operation, the given eye may be directly stimulated by subjecting it to specific lighting conditions.

At step 1302, upon sensing the specific light conditions, the microcontroller 110 may receive electrical signals transmitted from the light sensor placed inside the eye in response to being subjected to the specific lighting conditions. For example, when the eye is subjected to bright lighting conditions, the light sensor may transmit electrical signals informing the microcontroller 110 that the eye is subjected to bright light conditions, and when the eye is subjected to dark lighting conditions, the light sensor transmits electrical signals informing the microcontroller 110 that the eye is subjected to the dark lighting conditions. Under normal lighting conditions, the light sensor may transmit electrical signals informing the microcontroller 110 that the eyes subjected to normal lighting conditions.

At step 1303, upon receiving the electrical signals, the microcontroller 110 may determine whether to constrict or to dilate the iris of the eye. For example, when the light sensor (e.g., photodiode) informs the microcontroller 110 that the eye is subjected to bright lighting conditions, the microcontroller 110 may determine that the iris of the eye should be constricted, and when the light sensor informs the microcontroller 110 is subjected to dark lighting conditions, the microcontroller 110 may determine that the iris of the eye should be dilated.

At step 1304, based on this information, the microcontroller 110 may determine a size of the iris to be effected. For example, the electrical signals may include information regarding and intensity of the specific lighting conditions. Based on this information, the microcontroller 110 may determine a size of the iris to be effected to correspond to the intensity of the specific lighting conditions.

At step 1305, the microcontroller 110 may determine the current size of the iris of the eye. For example, the microcontroller 110 may instruct the iris size sensor for the given eye to report the current size of the iris of the eye. Once the microcontroller 110 has determined the current size of the iris of the eye, the method proceeds to step 1306.

At step 1306, the microcontroller 110 may first compare the current size of the iris with the size of the iris to be effected, as determined in step 1303.

At step 1307, based on the comparison of the current size and the determined size of the iris, the microprocessor 110 may determine whether to change the size of the iris. For example, if the microprocessor 110 determines that the current size of the iris corresponds to the determined size of the iris, then the microprocessor 110 may determine that no change to the current size of the iris is necessary. The method proceeds to step 1302. As such, the microprocessor 110 may allow the iris to remain in its reported current size. However, if based on the comparison of the current size and the determined size of the iris, the microprocessor 110 determines that the current size does not correspond to the determined size of the iris, then the microprocessor determines that the size of the iris should be changed to the determined size. The method proceeds to step 1308.

At step 1308, the microprocessor 110 may operate the iris motor of the eye to effect the constriction or the dilation of the iris of the eye.

The iris motor may be a geared motor coupled to a rotating arm that enables the circular aperture of the eye to circularly reduce in size when simulating constriction and to circularly increase in size when simulating dilation. In various embodiments the circular aperture may constrict to a circular size of about 1 mm in diameter and may dilate to a circular size of about 8 mm in diameter. That is, the circular aperture may have a circular size between 1 mm in diameter to 8 mm in diameter. In its default position, which may simulate normal light conditions, the circular aperture may have a circular size of about 4 mm in diameter. Also, the circular aperture may be of a blue or brown color to simulate a blue or brown iris in the eye. The circular aperture is attached to the background that simulates a pupil of a human eye. As the circular size of the aperture is changed with the background simulating the pupil, realistic replication of an iris (of a human eye) changing circular size in response to the surrounding lighting conditions is achieved.

At optional step 1309, once the size of the iris has been changed to the determined size, the microcontroller 110 may determine that the other eye that is not directly simulated by the specific light conditions may also need to be constricted or dilated in response to the specific light conditions discussed above.

At step 1310, the microcontroller 110 may effect constriction or dilation of the iris in the other eye by following similar steps as discussed above for the given eye that is directly simulated by the specific light conditions. Further, the microcontroller 110 may effect constriction or dilation of the iris in the other eye by a different amount with respect to the given eye.

Once the sizes of both the irises have been changed to the determined sizes of the irises, the method returns to step 1302, and steps 1302-1309 may be repeated. The method stops at 1311. In this way, the simulator realistically replicates the change in size of an iris in a human eye in a way that is useful for medical educational and diagnostic purposes. The method 1300 stops when the pupillary change functionality is stopped. At this time, the microcontroller 110 places both the right and left irises 1114, 1124 in their default sizes to simulate normal lighting conditions.

Blinking: Blinking maybe described as a physiological response which involves the closing and opening of an eyelid of an eye. Blinking is a normal reflex and protects the eyes from dryness, and also regulates tears to nourish and cleanse the surface of the eye. The blinking rate, which is the rate at which an eyelid closes and opens per unit of time, is an important medical indicator for healthy eyes. For example, healthy eyes exhibit a low rate of blinking of about 5-10 blinks per minute. On the other hand, an excessive blinking rate of about 30 blinks per minute and higher indicates unhealthy conditions such as dry eyes, nervousness, eye irritation, or psychiatric conditions. In various embodiments, the presently disclosed simulator realistically replicates the blinking of a human eye in a way that is useful for medical educational and diagnostic purposes.

In various embodiments, the simulator is configured to simulate blinking of human eyes. For example, the eyelids 103, 107 are operated to open and close to simulate blinking. In various embodiments, the rate, pattern, and speed of blinking are controlled by the control system illustrated in FIG. 14. In some instances the rate of blinking ranges from 5 blinks per minute to 30 blinks per minute. However, ranges outside of this are used in some embodiments. Further, the eyes can be maintained in an open position or a closed position. The speed of the blinks can be controlled as well. In some instances, the speed of each blink from an open position to a closed position and back to the open position is approximately 200 ms. However, the speed of the blinks can be increased or decreased as desired.

Figure 14:
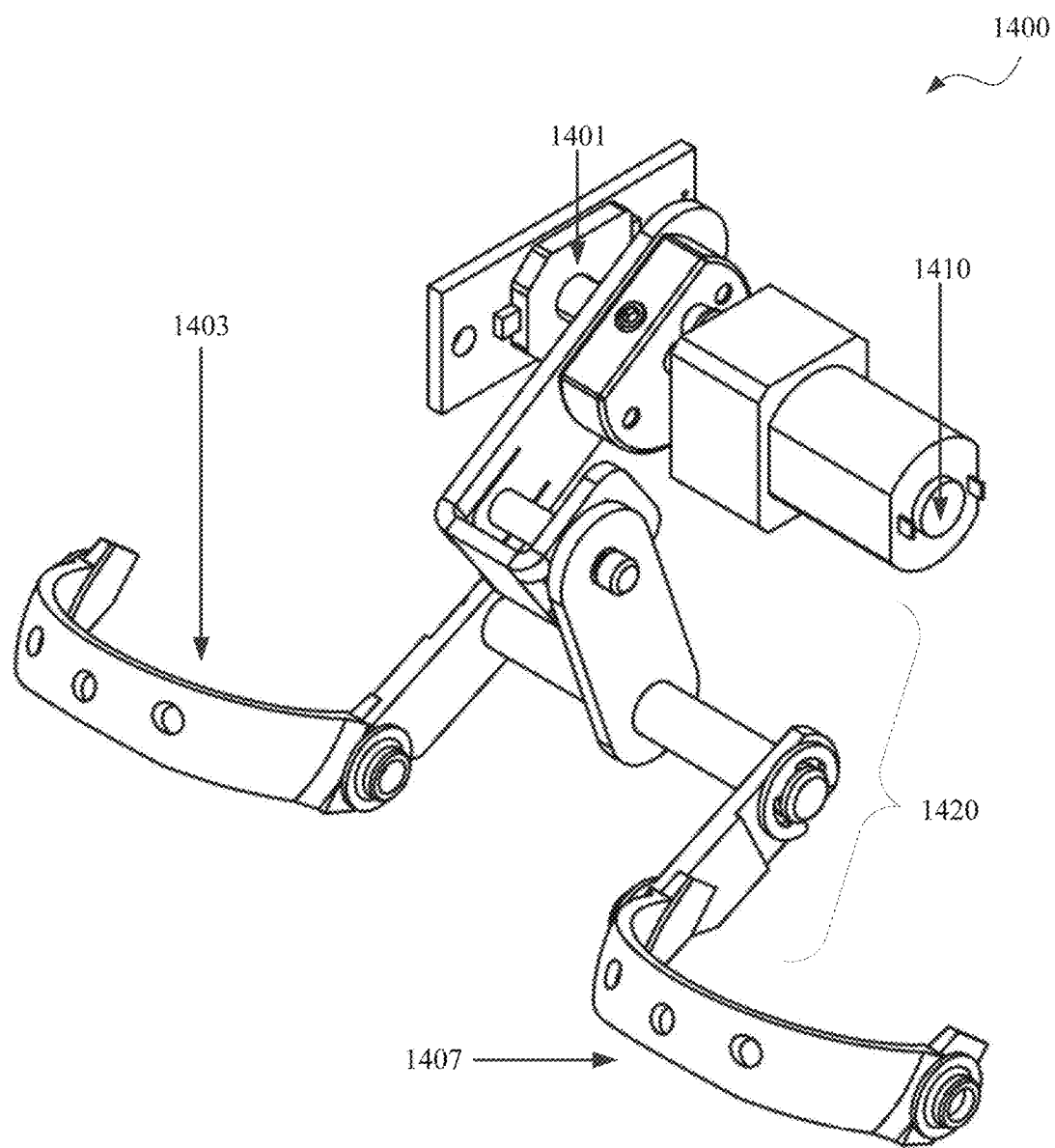
FIG. 14 illustrates an electro-mechanical block diagram 1400 of the simulator according to various embodiments of the present disclosure.

1401 FIG. 14 illustrates an electro-mechanical block diagram 1400 of the simulator according to various embodiments of the present disclosure. As previously discussed, the eye assembly may include the right eye 101 having the right eyelid 103, the left eye 105 having the left eyelid 107, and associated circuitry to control functions to be performed by the right and left eyes 101, 105. In various embodiments, the right and left eyelids 103, 107 are moved together to simulate blinking. For blinking functions, the simulator may include the microcontroller 110 electrically connected to an eyelid position sensor 1401 and a blink motor 1410 to actuate the right and left eyelids 103, 107 to simulate blinking. In various embodiments, the blinking of the right and left eyelids 103, 107 may be controlled independently, and each eyelids may have a dedicated blink motor to actuate the independently simulate blinking. The blinking may involve the right and left eyelids 103, 107 moving between an open position and a closed position, with the open position being the default position of the eyelids 103, 107. The blink motor 1410 may be attached to a four bar linkage 1420 capable of relaying the torque of the blink motor 1410 to two rotatable curved parts 1403, 1407. The rotatable curved parts 1403, 1407 may be covered by silicone material serving as the eyelids 103, 107. As such, when the microcontroller 110 operates the blink motor 1410 to rotate, the four bar linkage 1420 relays the torque to the two rotatable curved parts 1403, 1407 (i.e., the eyelids 103, 107) to simulate human blinking motion.

The microcontroller 110 may instruct the eyelid position sensor 1401 to report the current position of the two rotatable curved parts 1403, 1407 (i.e., the eyelids 103, 107). Further, the microcontroller 110 may continuously receive electrical signals from the eyelid position sensor 1401 to continuously monitor positions of the eyelids 103, 107. In various embodiments, the microcontroller 110 may continuously monitor the position of the eyelids 103, 107 when the blinking is actuated between the open and closed positions. During the monitoring, when the microcontroller 110 determines that the eyelids 103, 107 have reached the closed position, the microcontroller 110 may transmit electrical signals to reverse the rotation of the blink motor 1410 so that the eyelids 103, 107 are rotated to the open position.

In various embodiments, the sensors 140, 160, 240, 260, 1112, 1122, 1401 discussed above with respect to sensing positions of the pupils, size of the pupils, and positions of the eyelids may be rotary potentiometers. The rotary potentiometers may be electro-mechanically connected to the microcontroller 110 and to shafts of the various motors discussed above. The rotary potentiometers may be used as both the dividers to obtain adjustable output voltages. As a motor shaft rotates, the wiper (i.e., the sliding contact) of the corresponding rotary potentiometer slides along the resistive body between the terminals of the potentiometer. The sliding of the wiper provides a reading of the adjustable output voltage.

The microcontroller 110 monitors the adjustable output voltage, and refers to respective predetermined associations between output voltages and positions of the pupils, size of the pupils, or the positions of the eyelids to determine the respective current positions. For example, the microcontroller 110 may monitor the adjustable output voltage output by the right pupil position sensor 140, and refer to a predetermined association between the output voltage of the right pupil position sensor 140 and position of the right pupil 102 to determine a current position of the right pupil 102. Similarly, the microcontroller 110 may monitor the adjustable output voltage output by the eyelid position sensor 1401, and refer to a predetermined association between the output voltages of the eyelid position sensor 1401 and positions of the right and left eyelids 103, 107 to determine current positions of the right and left eyelids 103, 107. Finally, the microcontroller 110 may monitor the adjustable output voltage output by the left iris size sensor 1122, and refer to a predetermined association between the output voltages of the left iris size sensor 1122 and sizes of the left iris 1124 to determine a current size of the iris 1124. In addition to determining current positions and sizes, as discussed above, the microcontroller 110 may also use the monitored adjustable output voltages to confirm that the effected changes in the positions of the pupils and/or the eyelids and in the sizes of the irises have been accurately effected.

Mechanisms: As discussed previously, the microcontroller 110 may effect changes in the positions of the right and left pupils 102, 106 to simulate horizontal movements, vertical movements, and/or combination of horizontal and vertical movements. These movements of the right and left pupils 102, 106 in the various directions may be achieved by using a two axis gimbal, which is mounted to another rotating gimbal so that both the gimbals may rotate simultaneously to orient the pupils in any combination of horizontal and vertical rotation. This exemplary configuration of the gimbals also allows the vertical movement of the pupils 102, 106 to be independent from the horizontal movement of the pupils 102, 106. In various embodiments, the simulators according to the present disclosure may include two mechanisms to effect displacement of the right and left pupils 102, 106 in the various directions. For example, simulators may include a right mechanism to effect displacement of the right pupil 102 and a left mechanism to effect displacement of the left pupil 106.

Figure 15:
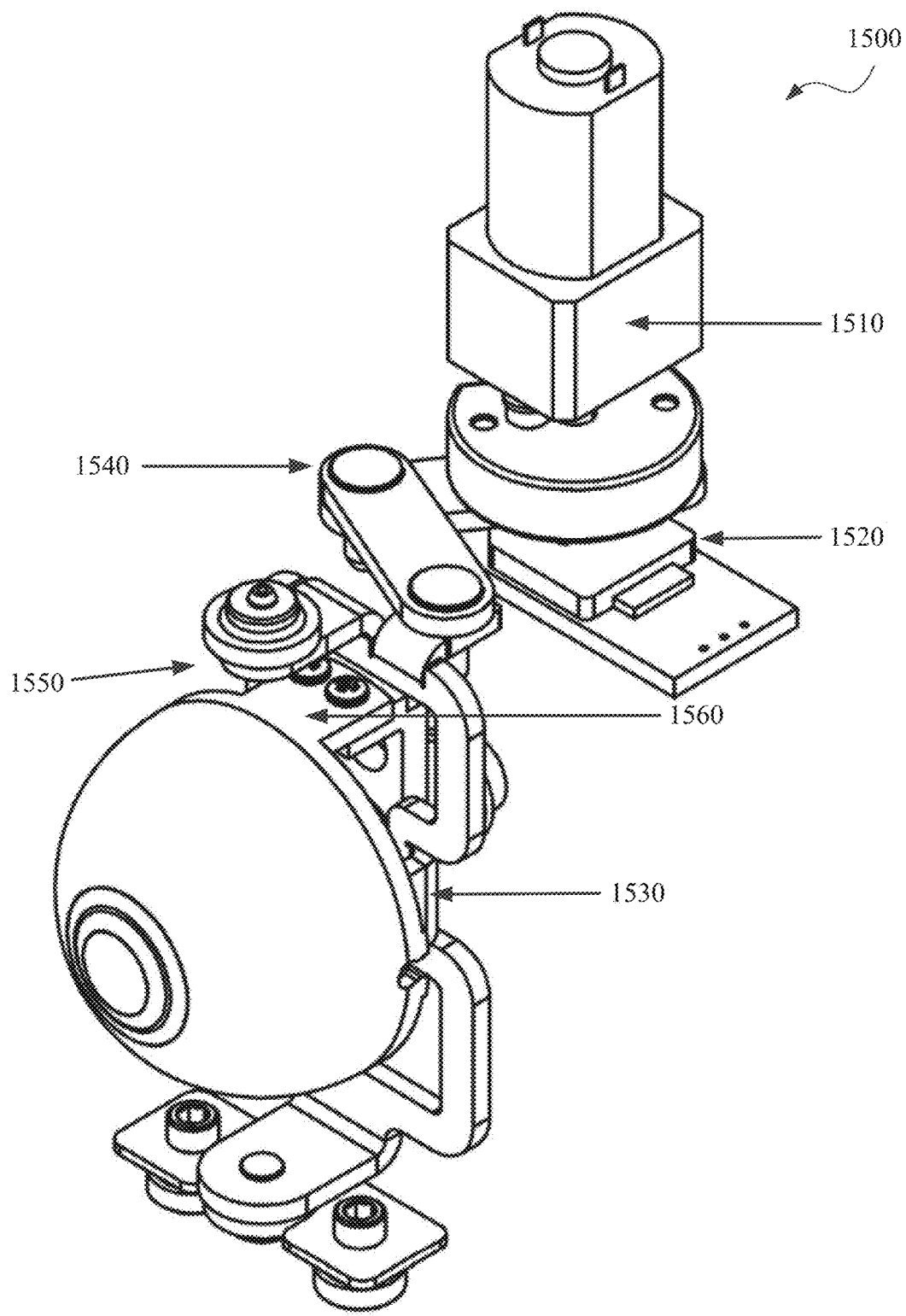
FIG. 15 illustrates an exemplary mechanism 1500 used for horizontal movement of a pupil (right or left) according to various embodiments of the present disclosure.

FIG. 15 illustrates an exemplary mechanism 1500 used for horizontal movement of a given pupil (right or left) according to various embodiments of the present disclosure. In various embodiments, the mechanism 1500 effects movement of a given pupil (right or left) in the horizontal direction. Each mechanism 1500 may include a pupil position motor 1510 (150 or 170), a pupil position sensor 1520 (140 or 160), a gimbal 1530, a lever 1540, and bearings 1550 for fixedly attaching the gimbal 1530 to a frame 1560 connected to the backend of a given pupil 102, 106. The motor assembly 1510 is electronically connected to the microcontroller 110. As discussed previously, the microcontroller 110 may instruct the pupil position motor 1510 to change the horizontal position of the right or left pupil. Once instructed, the pupil position motor 1510 rotates to effect movement of the lever 1540 that is attached to the gimbal 1530. As the lever 1540 moves, the gimbal 1530 rotates horizontally about an axis passing through the bearings 1550. As the gimbal 1530 rotates, the fixedly attached frame 1560 and, therefore, the pupil 102, 106 rotates within the exemplary range of horizontal movement for the right and left pupils 102, 106 illustrated in FIG. 3A. The right and left pupils 102, 106 may be controlled together. Alternative, the right and left pupils 102, 106 may be controlled independently to allow simulation of eyes converging towards the nose or to exhibit diplopia.

Figures 16A, 16B:
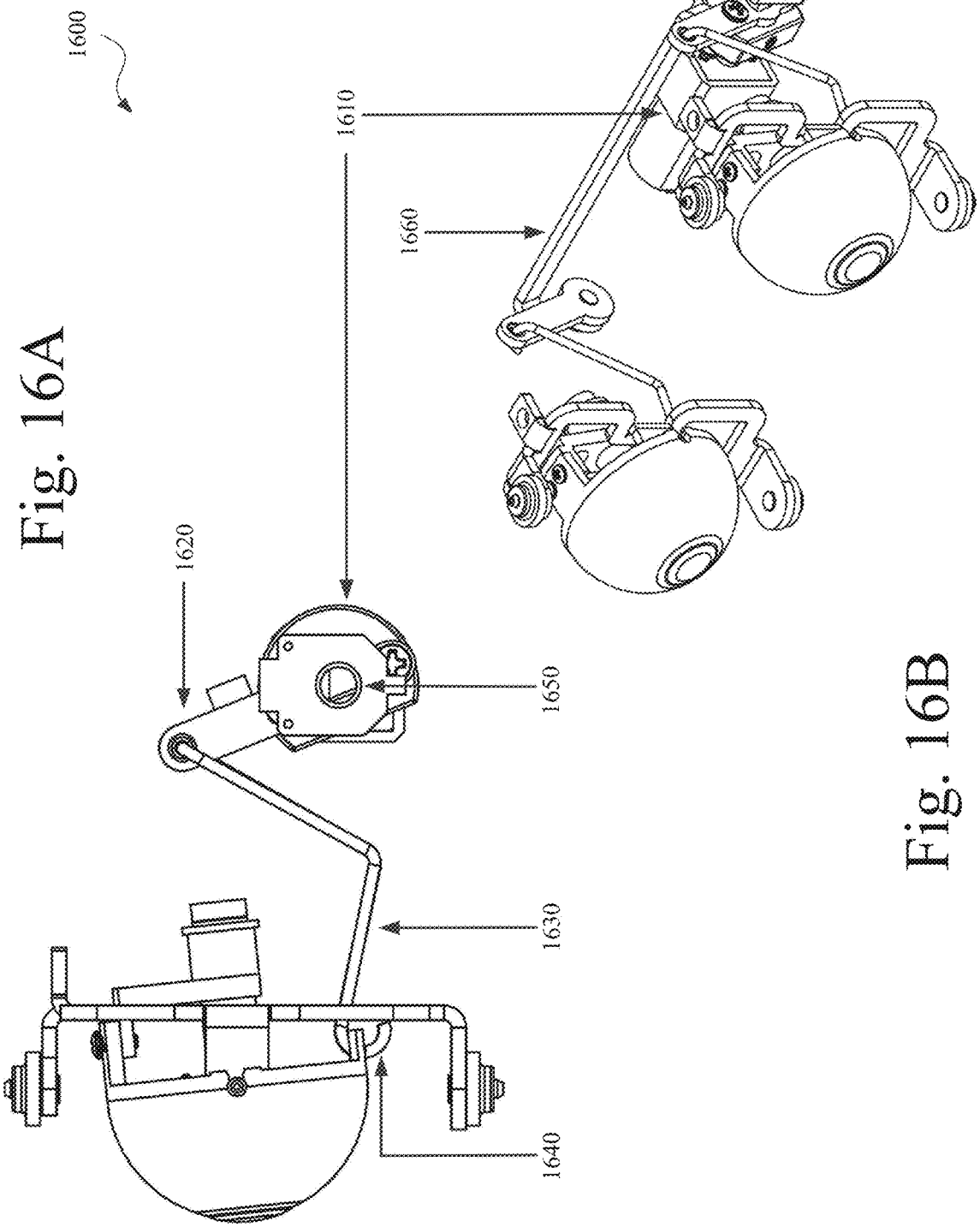
FIGS. 16A-B illustrate exemplary mechanisms 1600 used for vertical movement of a pupil (right or left) according to various embodiments of the present disclosure.

FIGS. 16A-B illustrate exemplary mechanisms 1600 used for vertical movement of a given pupil (right or left) according to various embodiments of the present disclosure. In various embodiments, the mechanism 1600 effects movement of a given pupil (right or left) in the vertical direction. Each mechanism 1600 may include a pupil position motor 1610 (250 or 270), a pupil position sensor 1650 (240 or 260), a gimbal assembly 1620, a lever 1630, a frame loop 1640 of the frame 1560 connected to the backend of a given pupil 102, 106. As discussed previously, the microcontroller 110 may instruct the pupil position motor 1610 to change the vertical position of the right or left pupil. Once instructed, the pupil position motor 1610 rotates to effect movement of the gimbal assembly 1620 that is attached to the lever 1630. As the lever 1630 moves, the crank arm 1630 is moved. As seen in FIGS. 16A-B, the crank arm 1630 is curved at the end proximal to the pupil 102, 106 and is attached to the frame loop 1640. The frame loop 1640 is either part of the frame 1564 is fixedly attached to the frame 1560. The movements of the crank arm 1630 attached to the frame loop 1640 rotate the pupil 102, 106 within the exemplary range of vertical movement for the right and left pupils 102, 106 illustrated in FIGS. 8A-C.

A center at the back of the frame 1560 may be connected to a center of the gimbal 1530, the connection serving as a fulcrum for the vertical rotation of the pupil 102, 106. As shown in FIG. 16B, the right and left pupils 102, 106 may be controlled together by using a hooked rod 1660 connecting the mechanisms for both the pupils 102, 106. Alternatively, the right and left pupils 102, 106 may be controlled independently to allow simulation of previously discussed pupil movements. In order to make the vertical rotation of the pupil 102, 106 independent from the horizontal rotation of the pupil 102, 106, the movement of the vertical gimbal 1620 should be unaffected by the horizontal rotation of the gimbal 1530. This may be achieved by using the crank arm 1630 that does not interfere with the horizontal rotation of the gimbal 1530. The mechanism 1600 also includes mechanical hard stops at both ends to ensure safe limits to the vertical rotation of the pupils 102, 106.

In human eyes, the right/left eyelids 103, 107 should also move upward and downward along with the upward and downward movement of the right/left pupils 102, 106. This is called eyelid following. It is critical that medical simulators test and diagnose this phenomenon. The present simulator mimics the lifelike motion of the eyelids during eyelid following.

The motion of the right/left eyelids 103, 107 relates to the vertical motion of the right/left pupils 102, 106. As the right/left pupils 102, 106 move upward or downward, the right/left eyelids 103, 107 follow the right/left pupils 102, 106 to maintain a constant distance between the pupils and the eyelids. For example, when the right pupil 102 moves downward, the right eyelid 103 follows the right pupil to maintain a constant distance between the right pupil 102 and the right eyelid 103. In this case, the right eyelid 103 moves downward towards its closed position but remains open enough to maintain the constant distance. Similarly, when the left pupil 106 moves upward, the left eyelid 107 follows the right pupil to maintain a constant distance between the left pupil 106 and the left eyelid 107. In this case, the left eyelid 107 moves upwards past its open position to maintain the constant distance. When the right/left pupils 102, 106 are looking substantially straight, the right/left eyelids are positioned in their nominal open positions. The simulator may employ the same mechanisms as employed for the eyelid blinking and vertical motion of the pupils discussed above. The right/left pupils 102, 106 act as the master since the right/left eyelids 103, 107 react to the movement of the right/left pupils 102, 106.

In addition to the above discussed preprogrammed routines, the simulator is configured to allow direct, real-time control of the positioning of the right/left pupils 102, 106 by using computer input devices, such as, the keyboard, mouse, or joystick connected through the input/output interface 190. The user may move the right/left pupils 102, 106 to any position that is a normal human lifelike position. In various embodiments, a graphical display may be presented to the user on the display connected through the input/output interface 190. The graphical display may depict an eye with a pupil and an iris. In various embodiments, a user may control the positioning of the right/left pupils 102, 106 on the simulator by controlling the position of the pupil of the graphical eye. The user may control the pupil of the graphical eye by moving the mouse cursor or the joystick to change the position of the pupil of the graphical eye, and thereby allow the microcontroller 110 to effect movement of the right pupil 102, the left pupil 106, or both. The user may also use a finger or stylus on a touch screen display and control the pupil of the graphical eye to change the position of the right pupil 102, the left pupil 106, or both.

As the cursor/joystick/finger moves, the microcontroller 110 receives the electrical signals associated with these movements through the input/output interface 190, and effects corresponding movements of the right/left pupils 102, 106. For example, a computer or processor connected to the cursor/joystick/finger provides the location of the cursor/joystick/finger in reference to the pupil of the graphical eye, and the microcontroller 110 converts the location of the pupil to the corresponding simulator positions of the right/left pupils 102, 106. The microcontroller may employ a pre-stored map having locations on the display screen depicting the graphical eye plotted to corresponding locations of the right/left pupils 102, 106 on the simulator. In various embodiments, when the cursor/joystick/finger is moved outside the graphical eye, the right/left pupils 102, 106 may be positioned in their default positions. The microcontroller 110 is configured to effect movements of the right/left pupils 102, 106 in real-time in any direction (e.g., vertical, horizontal, or both) either independently or together with respect to each other.

The system may also include pre-programmed patterns for the eye assemblies (including combinations of movement, dilation, and/or blinking) to simulate various patient scenarios. The system may also be configured to allow combinations of real-time control via cursor, joystick or other input with the pre-programmed patterns. For example, the pre-programmed pattern may continue until a control input for a real-time control is received. Similarly, the system may also be configured to allow combinations object tracking with the pre-programmed patterns. For example, the pre-programmed pattern may continue until a tracking object is detected by one of the sensors and/or an input for a object tracking is received from a user.

Although illustrative embodiments have been shown and described, a wide range of modification, change, and substitution is contemplated in the foregoing disclosure and in some instances, some features of the present disclosure may be employed without a corresponding use of the other features. It is understood that such variations may be made in the foregoing without departing from the scope of the embodiment. Accordingly, it is appropriate that the appended claims be construed broadly and in a manner consistent with the scope of the present disclosure.

What is claimed is:

1. A patient simulator, comprising:
a right eye assembly including a right eyelid, a right iris, and a right pupil;
a left eye assembly including a left eyelid, a left iris, and a left pupil;
a right optical sensor configured to sense a light condition associated with the right eye, and to provide a first right electrical signal based on the sensed light condition;
a right iris sensor configured to sense a size of the right iris, and to provide a second right electrical signal based on the sensed size;
a right iris motor mechanically coupled to the right iris and configured to change the size of the right iris based on a third right electrical signal;
a left optical sensor configured to sense a light condition associated with the left eye, and to provide a first left electrical signal based on the sensed light condition;
a left iris sensor configured to sense a size of the left iris, and to provide a second left electrical signal based on the sensed size;
a left iris motor mechanically coupled to the left iris and configured to change the size of the left iris based on a third left electrical signal;
a first pupil position sensor configured to sense a position of the right pupil, the left pupil, or both, and to provide a first electrical signal based on the sensed position;
a first pupil position motor mechanically coupled to the right eye assembly, the left eye assembly, or both, and configured to change the position of the right pupil, the left pupil, or both, based on a second electrical signal;
a second pupil position sensor configured to sense a position of the right pupil, the left pupil, or both, and to provide a third electrical signal based on the sensed position;
a second pupil position motor mechanically coupled to the right eye assembly, the left eye assembly, or both, and configured to change the position of the right pupil, the left pupil, or both, based on a fourth electrical signal;
at least one infrared (IR) transmitter configured to transmit IR radiation towards an object placed in front of the simulator;
at least one IR sensor configured to receive an IR response signal reflected off the object, said IR response signal including at least a portion of the IR radiation transmitted toward the object by the at least one IR transmitter; and
a microprocessor configured to:
generate the third right electrical signal based on the first and second right electrical signals provided by the right optical sensor and the right iris sensor, respectively;
generate the second electrical signal based on the first electrical signal provided by the first pupil position sensor;
generate the third left electrical signal based on the first and second left electrical signals provided by the left optical sensor and the left iris sensor, respectively;
generate the fourth electrical signal based on the third electrical signal provided by the second pupil position sensor;
determine a location of the object based on the sensing of the IR response signal by the at least one IR sensor; and
effect movement of the right pupil and/or the left pupil based on the determined location of the object.

2. The patient simulator of claim 1, wherein each of the right pupil and the left pupil is configured to move in a combination of a horizontal direction and a vertical direction.

3. The patient simulator of claim 1, wherein the IR transmitter is configured to transmit the IR radiation in a burst of frequency modulated pulses.

4. The patient simulator of claim 3, wherein the at least one IR sensor is configured to record a value corresponding to an intensity of the IR response signal.

5. The patient simulator of claim 1, wherein, to effect movement of the right pupil and/or the left pupil, the microprocessor is configured to compare a current position of the right pupil and/or the left pupil with the determined location of the object.

6. The patient simulator of claim 5, wherein the microprocessor is configured to effect movement of the right pupil jointly with respect to the movement of the left pupil.

7. The patient simulator of claim 5, wherein the microprocessor is configured to effect movement of the right pupil independently with respect to the movement of the left pupil.

8. The patient simulator of claim 1, wherein the right optical sensor is placed within the right eye and the left optical sensor is placed within the left eye.

9. The patient simulator of claim 1, wherein the microprocessor is electrically connected to the right optical sensor and to the left optical sensor, and is configured to receive the first right electrical signal and the first left electrical signal.

10. The patient simulator of claim 1, wherein the right iris motor is configured to change the size of the right iris by increasing or decreasing a circular size of the right iris, and the left iris motor is configured to change the size of the left iris by increasing or decreasing a circular size of the left iris.

11. The patient simulator of claim 10, wherein the right iris motor is configured to increase or decrease the circular size of the right iris within a diametric range of 1 mm to 8 mm and/or the left iris motor is configured to increase or decrease the circular size of the left iris within the diametric range of 1 mm to 8 mm.

12. The patient simulator of claim 1, wherein the patient simulator further includes at least one blink motor mechanically coupled to the right eyelid and/or to the left eyelid; and
wherein the microprocessor is configured to electrically actuate the at least one blink motor to rotate, wherein rotation of the at least one blink motor results in motion of the right eyelid and/or the left eyelid to simulate blinking.

13. The patient simulator of claim 12, further comprising:
a right eyelid position sensor electrically coupled to the microprocessor, and configured to report a current position of the right eyelid; and
a left eyelid position sensor electrically coupled to the microprocessor, and configured to report a current position of the left eyelid.

14. The patient simulator of claim 13, wherein the right and left eyelid position sensors are rotary potentiometers.

15. The patient simulator of claim 12, wherein motion of the right eyelid is independent from the motion of the left eyelid.

16. The patient simulator of claim 12, wherein the microprocessor is configured to control a speed of motion of the right eyelid and/or the left eyelid.

17. The patient simulator of claim 1, wherein the microprocessor is configured to change the size of the iris by increasing or decreasing a circular size of the iris.

18. The patient simulator of claim 17, wherein the microprocessor is configured to increase or decrease the circular size of the iris within a diametric range of 1 mm to 8 mm.

19. The patient simulator of claim 1,
wherein the first pupil position sensor is configured to sense a horizontal position of the right pupil, and to provide the first electrical signal based on the sensed horizontal position of the right pupil;
wherein the first pupil position motor is mechanically coupled to the right eye assembly, and is configured to change the horizontal position of the right pupil based on the second electrical signal;
wherein the second pupil position sensor is configured to sense a horizontal position of the left pupil, and to provide the third electrical signal based on the sensed horizontal position of the left pupil; and
wherein the second pupil position motor is mechanically coupled to the left eye assembly, and is configured to change the horizontal position of the left pupil based on the fourth electrical signal.

20. The patient simulator of claim 1, further comprising:
a third pupil position sensor configured to sense a position of the right pupil, the left pupil, or both, and to provide a fifth electrical signal based on the sensed position; and
a third pupil position motor mechanically coupled to the right eye assembly, the left eye assembly, or both, and configured to change the position of the right pupil, the left pupil, or both, based on a sixth electrical signal;
wherein the microprocessor is further configured to:
generate the sixth electrical signal based on the fifth electrical signal provided by the third pupil position sensor.

21. The patient simulator of claim 20,
wherein the first pupil position sensor is configured to sense a horizontal position of the right pupil, and to provide the first electrical signal based on the sensed horizontal position of the right pupil;
wherein the first pupil position motor is mechanically coupled to the right eye assembly, and is configured to change the horizontal position of the right pupil based on the second electrical signal;
wherein the second pupil position sensor is configured to sense a horizontal position of the left pupil, and to provide the third electrical signal based on the sensed horizontal position of the left pupil;
wherein the second pupil position motor is mechanically coupled to the left eye assembly, and is configured to change the horizontal position of the left pupil based on the fourth electrical signal;
wherein the third pupil position sensor is configured to sense a vertical position of both the right pupil and the left pupil, and to provide the fifth electrical signal based on the sensed vertical position; and
wherein the third pupil position motor is mechanically coupled to both the right eye assembly and the left eye assembly, and is configured to change the vertical position of both the right pupil and the left pupil based on the sixth electrical signal.

22. A method, comprising:
transmitting, via a first infrared (IR) transmitter, first IR radiation towards an object placed in front of a simulator including a right eye assembly having a right pupil and a left eye assembly having a left pupil;
sensing, via a first IR sensor, a predetermined number of readings of first sensed data based on at least a portion of the first IR radiation being reflected off the object from the first IR transmitter;
transmitting, via a second infrared (IR) transmitter, second IR radiation towards the object;
sensing, via a second IR sensor, a predetermined number of readings of second sensed data based on at least a portion of the second IR radiation being reflected off the object from the second IR transmitter;
averaging, via a microprocessor, the predetermined number of readings of the first sensed data to calculate average first sensed data and the predetermined number of readings of the second sensed data to calculate average second sensed data;
comparing, via the microprocessor, the average first sensed data with the average second sensed data;

determining, via the microprocessor, a location of the object based on the comparing of the average first sensed data with the average second sensed data;
effecting movement, via the microprocessor, of the right pupil and/or the left pupil based on a result of the comparing of the average first sensed data with the average second sensed data;
sensing, via a right optical sensor, a light condition associated with the right eye assembly, the right eye assembly including a right iris;
providing, by the right optical sensor, a first right electrical signal based on the sensed light condition associated with the right eye assembly;
sensing, via a right iris sensor, a size of the right iris;
providing, by the right iris sensor, a second right electrical signal based on the sensed size of the right iris;
sensing, via a left optical sensor, a light condition associated with the left eye assembly, the left eye assembly including a left iris;
providing, by the left optical sensor, a first left electrical signal based on the sensed light condition associated with the left eye assembly;
sensing, via a left iris sensor, a size of the left iris;
providing, by the left iris sensor, a second left electrical signal based on the sensed size of the left iris;
generating, via the microprocessor, a third right electrical signal based on the first and second right electrical signals provided by the right optical sensor and the right iris sensor, respectively;
changing, via a right iris motor mechanically coupled to the right iris, the size of the right iris based on the generated third right electrical signal;
generating, via the microprocessor, a third left electrical signal based on the first and second left electrical signals provided by the left optical sensor and the left iris sensor, respectively; and
changing, via a left iris motor mechanically coupled to the left iris, the size of the left iris based on the generated third left electrical signal;
wherein effecting the movement, via the microprocessor, of the right pupil and/or the left pupil based on the result of the comparing of the average first sensed data with the average second sensed data comprises:
sensing, via a first pupil position sensor, a position of the right pupil, the left pupil, or both;
providing, by the first pupil position sensor, a first electrical signal based on the sensed position of the right pupil, the left pupil, or both;
changing, using a first pupil position motor mechanically coupled to the right eye assembly, the left eye assembly, or both, the position of the right pupil, the left pupil, or both, based on a second electrical signal;
generating, via the microprocessor, the second electrical signal based on the first electrical signal provided by the first pupil position sensor;
sensing, via a second pupil position sensor, a position of the right pupil, the left pupil, or both;
providing, by the second pupil position sensor, a third electrical signal based on the sensed position of the right pupil, the left pupil, or both;
changing, using a second pupil position motor mechanically coupled to the right eye assembly, the left eye assembly, or both, the position of the right pupil, the left pupil, or both, based on a fourth electrical signal; and
generating, via the microprocessor, the fourth electrical signal based on the third electrical signal provided by the second pupil position sensor.

23. The method of claim 22, further comprising:
mechanically coupling at least one blink motor to a right eyelid of the right eye assembly and to a left eyelid of the left eye assembly; and
electrically actuating, via the microprocessor, the at least one blink motor to rotate, wherein rotation of the at least one blink motor results in motion of the right eyelid and/or the left eyelid to simulate blinking.

24. The method of claim 22,
wherein the first pupil position sensor senses a horizontal position of the right pupil, and provides the first electrical signal based on the sensed horizontal position of the right pupil;
wherein the first pupil position motor is mechanically coupled to the right eye assembly, and changes the horizontal position of the right pupil based on the second electrical signal;
wherein the second pupil position sensor senses a horizontal position of the left pupil, and provides the third electrical signal based on the sensed horizontal position of the left pupil; and
wherein the second pupil position motor is mechanically coupled to the left eye assembly, and changes the horizontal position of the left pupil based on the fourth electrical signal.

25. The method of claim 22, wherein effecting the movement, via the microprocessor, of the right pupil and/or the left pupil further comprises:
sensing, via a third pupil position sensor, a position of the right pupil, the left pupil, or both;
providing, by the third pupil position sensor, a fifth electrical signal based on the sensed position of the right pupil, the left pupil, or both;
changing, using a third pupil position motor mechanically coupled to the right eye assembly, the left eye assembly, or both, the position of the right pupil, the left pupil, or both, based on a sixth electrical signal; and
generating, via the microprocessor, the sixth electrical signal based on the fifth electrical signal provided by the third pupil position sensor.

26. The method of claim 25,
wherein the first pupil position sensor senses a horizontal position of the right pupil, and provides the first electrical signal based on the sensed horizontal position of the right pupil;
wherein the first pupil position motor is mechanically coupled to the right eye assembly, and changes the horizontal position of the right pupil based on the second electrical signal;
wherein the second pupil position sensor senses a horizontal position of the left pupil, and provides the third electrical signal based on the sensed horizontal position of the left pupil;
wherein the second pupil position motor is mechanically coupled to the left eye assembly, and changes the horizontal position of the left pupil based on the fourth electrical signal;
wherein the third pupil position sensor senses a vertical position of both the right pupil and the left pupil, and provides the fifth electrical signal based on the sensed vertical position; and
wherein the third pupil position motor is mechanically coupled to both the right eye assembly and the left eye assembly, and changes the vertical position of both the right pupil and the left pupil based on the sixth electrical signal.

27. A patient simulator, comprising:
an eye assembly including an iris and a pupil;
an optical sensor configured to sense a light condition associated with the eye assembly, and to provide a first electrical signal based on the sensed light condition;
an iris sensor configured to sense a size of the iris, and to provide a second electrical signal based on the sensed size;
an iris motor mechanically coupled to the iris and configured to change the size of the iris based on a third electrical signal;
a first pupil position sensor configured to sense a position of the pupil, and to provide a first electrical signal based on the sensed position;
a first pupil position motor mechanically coupled to the eye assembly and configured to change the position of the pupil based on a second electrical signal; and
a microprocessor configured to:
generate the third electrical signal based on the first and second electrical signals provided by the optical sensor and the iris sensor, respectively; and
generate the second electrical signal based on the first electrical signal provided by the first pupil position sensor.

28. The patient simulator of claim 27, wherein the optical sensor is placed within the eye assembly.

29. The patient simulator of 27, wherein the microprocessor is electrically connected to the optical sensor, and is configured to receive the first electrical signal.

30. The patient simulator of claim 27,
wherein the first pupil position sensor is configured to sense a horizontal position of the pupil, and to provide the first electrical signal based on the sensed horizontal position;
wherein the first pupil position motor is configured to change the horizontal position of the pupil based on the second electrical signal.

31. The patient simulator of claim 27, further comprising:
a second pupil position sensor configured to sense a position of the pupil, and to provide a third electrical signal based on the sensed position; and
a second pupil position motor mechanically coupled to the eye assembly and configured to change the position of the pupil based on a fourth electrical signal;
wherein the microprocessor is further configured to:
generate the fourth electrical signal based on the third electrical signal provided by the second pupil position sensor.

32. The patient simulator of claim 31, wherein the first pupil position sensor is configured to sense a horizontal position of the pupil, and to provide the first electrical signal based on the sensed horizontal position;
wherein the first pupil position motor is configured to change the horizontal position of the pupil based on the second electrical signal;
wherein the second pupil position sensor is configured to sense a vertical position of the pupil, and to provide the third electrical signal based on the sensed vertical position; and
wherein the second pupil position motor is configured to change the vertical position of the pupil based on the fourth electrical signal.

33. A method, comprising:
sensing, via an optical sensor, a light condition associated with an eye assembly, the eye assembly including an iris and a pupil;
providing, by the optical sensor, a first electrical signal based on the sensed light condition associated with the eye assembly;
sensing, via an iris sensor, a size of the iris;
providing, by the iris sensor, a second electrical signal based on the sensed size of the iris;
generating, via a microprocessor, a third electrical signal based on the first and second electrical signals provided by the optical sensor and the iris sensor, respectively;
changing, via an iris motor mechanically coupled to the iris, the size of the iris based on the generated third electrical signal;
sensing, via a first pupil position sensor, a position of the pupil;
providing, by the first pupil position sensor, a first electrical signal based on the sensed position of the pupil;
changing, using a first pupil position motor mechanically coupled to the eye assembly, the position of the pupil based on a second electrical signal; and
generating, via the microprocessor, the second electrical signal based on the first electrical signal provided by the first pupil position sensor.

34. The method of claim 33,
wherein the first pupil position sensor senses a horizontal position of the pupil and provides the first electrical signal based on the sensed horizontal position of the pupil;
wherein the first pupil position motor changes the horizontal position of the pupil based on the second electrical signal.

35. The method of claim 33, further comprising:
sensing, via a second pupil position sensor, a position of the pupil;
providing, by the second pupil position sensor, a third electrical signal based on the sensed position of the pupil;
changing, using a second pupil position motor mechanically coupled to the eye assembly, the position of the pupil based on a fourth electrical signal; and
generating, via the microprocessor, the fourth electrical signal based on the third electrical signal provided by the second pupil position sensor.

36. The method of claim 35,
wherein the first pupil position sensor senses a horizontal position of the pupil and provides the first electrical signal based on the sensed horizontal position of the pupil;
wherein the first pupil position motor changes the horizontal position of the pupil based on the second electrical signal;
wherein the second pupil position sensor senses a vertical position of the pupil and provides the third electrical signal based on the sensed vertical position of the pupil; and
wherein the second pupil position motor changes the vertical position of the pupil based on the fourth electrical signal.

37. A patient simulator, comprising:
a first eye assembly including a first pupil;
a first pupil position sensor configured to sense a position of the first pupil, and to provide a first electrical signal based on the sensed position of the first pupil;

a first pupil position motor mechanically coupled to the first eye assembly and configured to change the position of the first pupil based on a second electrical signal; and a microprocessor configured to:
generate the second electrical signal based on the first electrical signal provided by the first pupil position sensor.

38. The patient simulator of claim 37,
wherein the first pupil position sensor is configured to sense a horizontal position of the first pupil, and to provide the first electrical signal based on the sensed horizontal position of the first pupil; and
wherein the first pupil position motor is configured to change the horizontal position of the first pupil based on the second electrical signal.

39. The patient simulator of claim 37,
wherein the first pupil position sensor is configured to sense a vertical position of the first pupil, and to provide the first electrical signal based on the sensed vertical position of the first pupil; and
wherein the first pupil position motor is configured to change the vertical position of the first pupil based on the second electrical signal.

40. The patient simulator of claim 37, further comprising:
a second eye assembly including a second pupil;
a second pupil position sensor configured to sense a position of the second pupil, and to provide a third electrical signal based on the sensed position of the second pupil; and
a second pupil position motor mechanically coupled to the second eye assembly and configured to change the position of the second pupil based on a fourth electrical signal;
wherein the microprocessor is further configured to:
generate the fourth electrical signal based on the third electrical signal provided by the second pupil position sensor.

41. The patient simulator of claim 40, further comprising:
a third pupil position sensor configured to sense a position of the first pupil, the second pupil, or both, and to provide a fifth electrical signal based on the sensed position of the first pupil, the second pupil, or both; and
a third pupil position motor mechanically coupled to the first eye assembly, the second eye assembly, or both, and configured to change the position of the first pupil, the second pupil, or both, based on a sixth electrical signal;
wherein the microprocessor is further configured to:
generate the sixth electrical signal based on the fifth electrical signal provided by the third pupil position sensor.

42. The patient simulator of claim 41,
wherein the first pupil position sensor is configured to sense a horizontal position of the first pupil, and to provide the first electrical signal based on the sensed horizontal position of the first pupil;
wherein the first pupil position motor is configured to change the horizontal position of the first pupil based on the second electrical signal;
wherein the second pupil position sensor is configured to sense a horizontal position of the second pupil, and to provide the third electrical signal based on the sensed horizontal position of the second pupil;
wherein the second pupil position motor is configured to change the horizontal position of the second pupil based on the fourth electrical signal;

wherein the third pupil position sensor is configured to sense a vertical position of the first pupil, the second pupil, or both, and to provide the fifth electrical signal based on the sensed vertical position of the first pupil, the second pupil, or both; and
wherein the third pupil position motor is configured to change the vertical position of the first pupil, the second pupil, or both, based on the sixth electrical signal.

43. A method, comprising:
sensing, via a first pupil position sensor associated with a first eye assembly having a first pupil, a position of the first pupil;
providing, by the first pupil position sensor, a first electrical signal based on the sensed position of the first pupil;
changing, using a first pupil position motor mechanically coupled to the first eye assembly, the position of the first pupil based on a second electrical signal; and
generating, via a microprocessor, the second electrical signal based on the first electrical signal provided by the first pupil position sensor.

44. The method of claim 43,
wherein the first pupil position sensor senses a horizontal position of the first pupil, and provides the first electrical signal based on the sensed horizontal position of the first pupil; and
wherein the first pupil position motor changes the horizontal position of the first pupil based on the second electrical signal.

45. The method of claim 43,
wherein the first pupil position sensor senses a vertical position of the first pupil, and provides the first electrical signal based on the sensed vertical position of the first pupil; and
wherein the first pupil position motor changes the vertical position of the first pupil based on the second electrical signal.

46. The method of claim 43, further comprising:
sensing, via a second pupil position sensor associated with a second eye assembly having a second pupil, a position of the second pupil;
providing, by the second pupil position sensor, a third electrical signal based on the sensed position of the second pupil;
changing, using a second pupil position motor mechanically coupled to the second eye assembly, the position of the second pupil based on a fourth electrical signal; and
generate, via the microprocessor, the fourth electrical signal based on the third electrical signal provided by the second pupil position sensor.

47. The method of claim 46, further comprising:
sensing, via a third pupil position sensor associated with the first eye assembly, the second eye assembly, or both, a position of the first pupil, the second pupil, or both;
providing, by the third pupil position sensor, a fifth electrical signal based on the sensed position of the first pupil, the second pupil, or both; and
changing, using a third pupil position motor mechanically coupled to the first eye assembly, the second eye assembly, or both, the position of the first pupil, the second pupil, or both, based on a sixth electrical signal; and
generating, via the microprocessor, the sixth electrical signal based on the fifth electrical signal provided by the third pupil position sensor.

48. The method of claim 47,
wherein the first pupil position sensor senses a horizontal position of the first pupil, and provides the first electrical signal based on the sensed horizontal position of the first pupil;
wherein the first pupil position motor changes the horizontal position of the first pupil based on the second electrical signal;
wherein the second pupil position sensor senses a horizontal position of the second pupil, and provides the third electrical signal based on the sensed horizontal position of the second pupil;
wherein the second pupil position motor changes the horizontal position of the second pupil based on the fourth electrical signal;
wherein the third pupil position sensor senses a vertical position of the first pupil, the second pupil, or both, and provides the fifth electrical signal based on the sensed vertical position of the first pupil, the second pupil, or both; and
wherein the third pupil position motor changes the vertical position of the first pupil, the second pupil, or both, based on the sixth electrical signal.

\* \* \* \* \*